(12) United States Patent
Kobayashi

(10) Patent No.: US 9,918,089 B2
(45) Date of Patent: Mar. 13, 2018

(54) IMAGE CODING APPARATUS, IMAGE CODING METHOD, AND PROGRAM, PERTAINING TO AN IMAGE QUALITY PARAMETER, AND IMAGE DECODING APPARATUS, IMAGE DECODING METHOD, AND PROGRAM, PERTAINING TO AN IMAGE QUALITY PARAMETER

(71) Applicant: CANON KABUSHIKI KAISHA, Tokyo (JP)

(72) Inventor: Masaaki Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/231,461

(22) Filed: Aug. 8, 2016

(65) Prior Publication Data

US 2016/0353105 A1    Dec. 1, 2016

Related U.S. Application Data

(63) Continuation of application No. 13/979,617, filed as application No. PCT/JP2012/000151 on Jan. 12, 2012, now Pat. No. 9,445,094.

(30) Foreign Application Priority Data

Jan. 13, 2011  (JP) ................................ 2011-004648

(51) Int. Cl.
*H04N 11/02* (2006.01)
*H04N 19/124* (2014.01)
(Continued)

(52) U.S. Cl.
CPC ......... *H04N 19/124* (2014.11); *H04N 19/119* (2014.11); *H04N 19/136* (2014.11);
(Continued)

(58) Field of Classification Search
CPC .................................................... H04N 19/124
(Continued)

(56) References Cited

U.S. PATENT DOCUMENTS 5,369,439 A * 11/1994 Matsuda .............. H04N 19/176
375/240.2
5,754,699 A *  5/1998 Sugahara ............... H04N 19/90
375/E7.14
(Continued)

FOREIGN PATENT DOCUMENTS

EP    2192785 A1    6/2010
EP    2273796 A2    1/2011
(Continued)

OTHER PUBLICATIONS

Thomas Wiegand, et al., WD1: Working Draft 1 of High-Efficiency Video Coding, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document JCTVC-C403, 137 pages.

*Primary Examiner* — Leron Beck
(74) *Attorney, Agent, or Firm* — Canon U.S.A., Inc. IP Division

(57) ABSTRACT

An image coding method for an image coding apparatus configured to divide an image into divisional blocks of a plurality of sizes and to perform coding on the image while controlling image quality according to a parameter value in units of divisional blocks includes acquiring a block size of a target block to be coded, acquiring a minimum block size used to control the parameter value, acquiring a state of division of the target block, acquiring the parameter value, determining whether the target block is divided according to the state of division of the target block, determining whether the block size of the target block is greater than or equal to the minimum block size, determining whether the block size (Continued)

of the target block is equal to the minimum block size, and coding the acquired parameter value.

29 Claims, 22 Drawing Sheets

(51) Int. Cl.
  *H04N 19/176* (2014.01)
  *H04N 19/119* (2014.01)
  *H04N 19/96* (2014.01)
  *H04N 19/463* (2014.01)
  *H04N 19/136* (2014.01)
  *H04N 19/60* (2014.01)
  *H04N 19/196* (2014.01)

(52) U.S. Cl.
  CPC ......... *H04N 19/176* (2014.11); *H04N 19/196* (2014.11); *H04N 19/463* (2014.11); *H04N 19/60* (2014.11); *H04N 19/96* (2014.11)

(58) Field of Classification Search
  USPC ........................................ 375/240.01–240.29
  See application file for complete search history.

(56) References Cited

U.S. PATENT DOCUMENTS

| | | | | |
|---|---|---|---|---|
| 6,002,802 A * | 12/1999 | Chujoh | ................ | H04N 19/176 375/E7.027 |
| 6,477,280 B1 * | 11/2002 | Malvar | ................... | H03M 7/40 375/E7.047 |
| 7,469,011 B2 * | 12/2008 | Lin | ........................ | H04N 19/52 341/109 |
| 2005/0053151 A1 | 3/2005 | Lin et al. | | |
| 2006/0188021 A1 * | 8/2006 | Suzuki | ................. | H04N 19/105 375/240.16 |
| 2006/0209952 A1 | 9/2006 | Tanizawa et al. | | |
| 2009/0285301 A1 * | 11/2009 | Kurata | ................... | H04N 19/51 375/240.16 |
| 2010/0074338 A1 | 3/2010 | Yamori et al. | | |
| 2011/0317757 A1 * | 12/2011 | Coban | ................... | H04N 19/197 375/240.02 |
| 2012/0014436 A1 * | 1/2012 | Segall | ................ | H04N 7/26755 375/240.12 |
| 2012/0044992 A1 * | 2/2012 | Chong | ................... | H04N 19/46 375/240.12 |
| 2012/0140822 A1 * | 6/2012 | Wang | ................... | H04N 19/197 375/240.12 |
| 2013/0230103 A1 * | 9/2013 | Lim | ...................... | H04N 19/51 375/240.12 |
| 2015/0249840 A1 * | 9/2015 | Kim | ..................... | H04N 19/149 375/240.2 |

FOREIGN PATENT DOCUMENTS

| | | |
|---|---|---|
| RU | 2350040 C1 | 3/2009 |
| WO | 2011/140211 A2 | 11/2011 |
| WO | 2012/042890 A1 | 4/2012 |
| WO | 2012/062161 A1 | 5/2012 |

* cited by examiner

[Fig. 1]
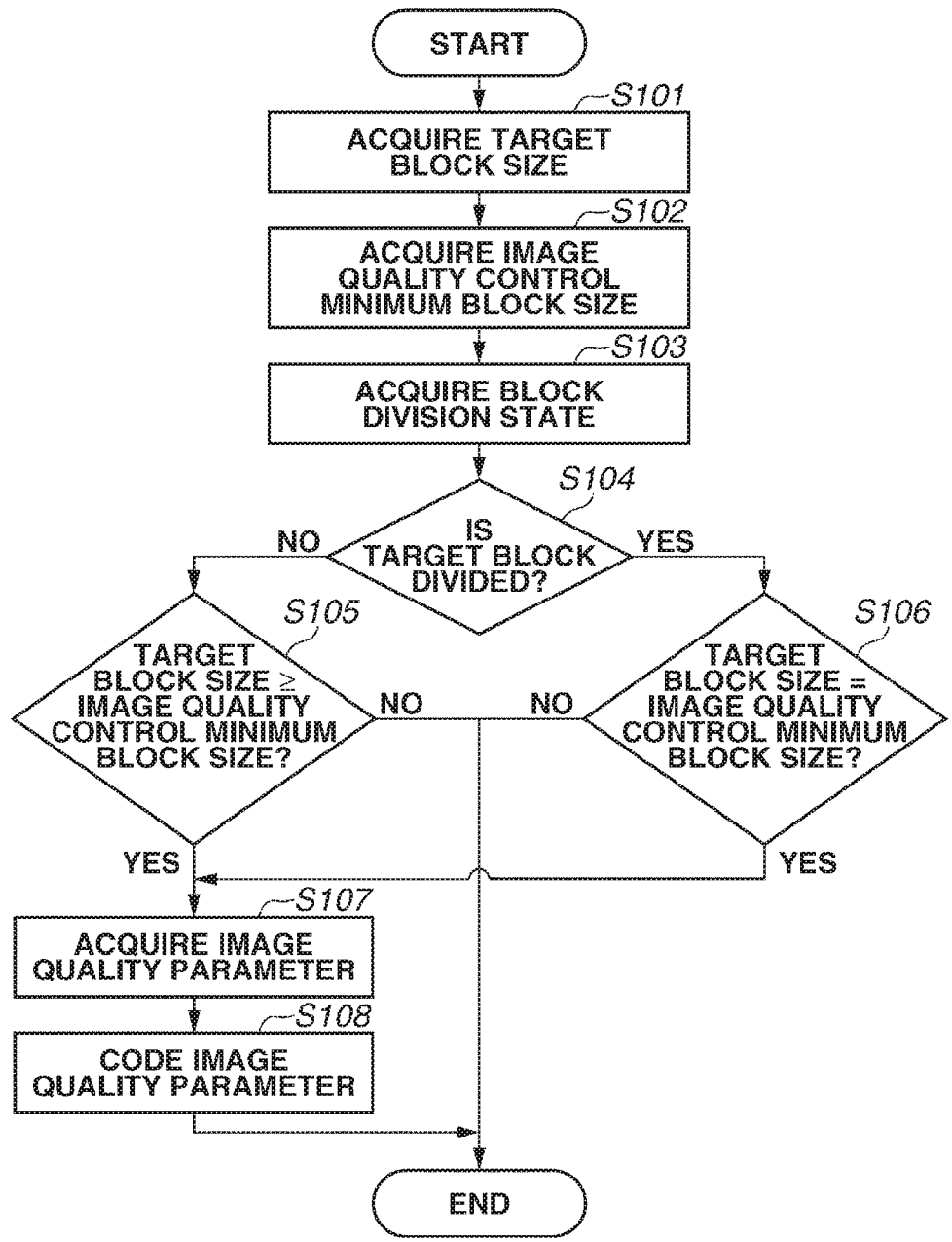

[Fig. 2]
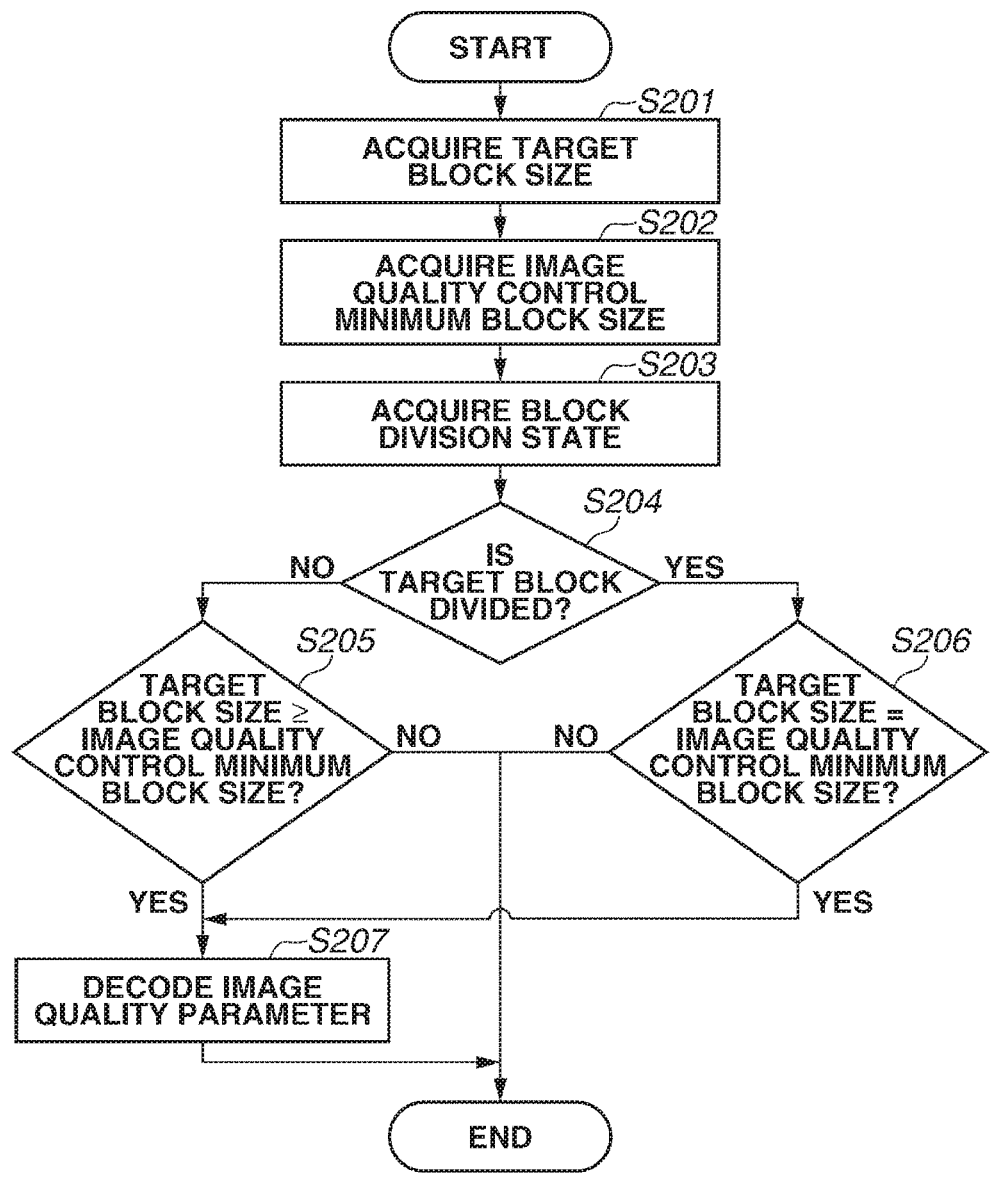

[Fig. 3]
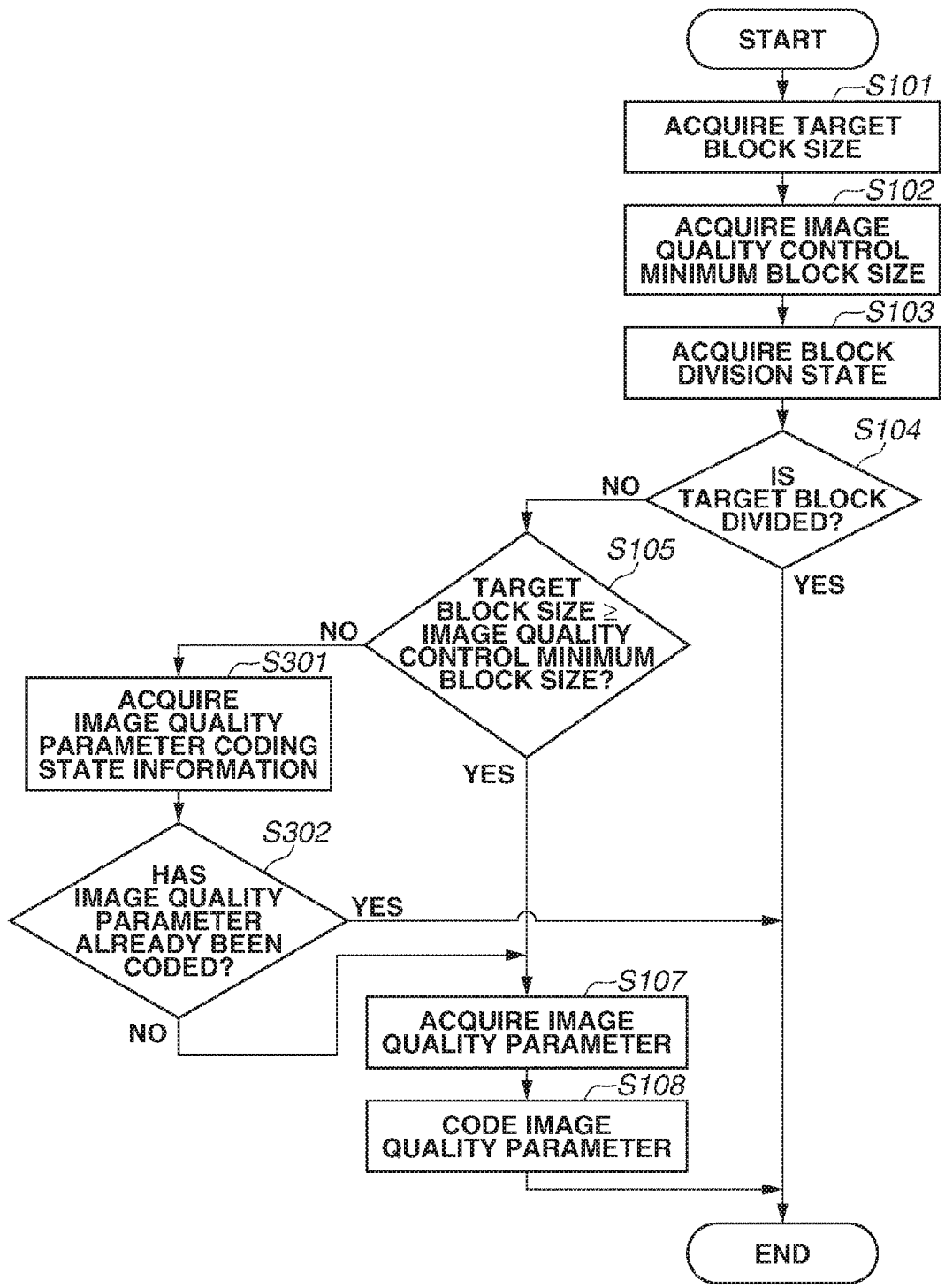

[Fig. 4]
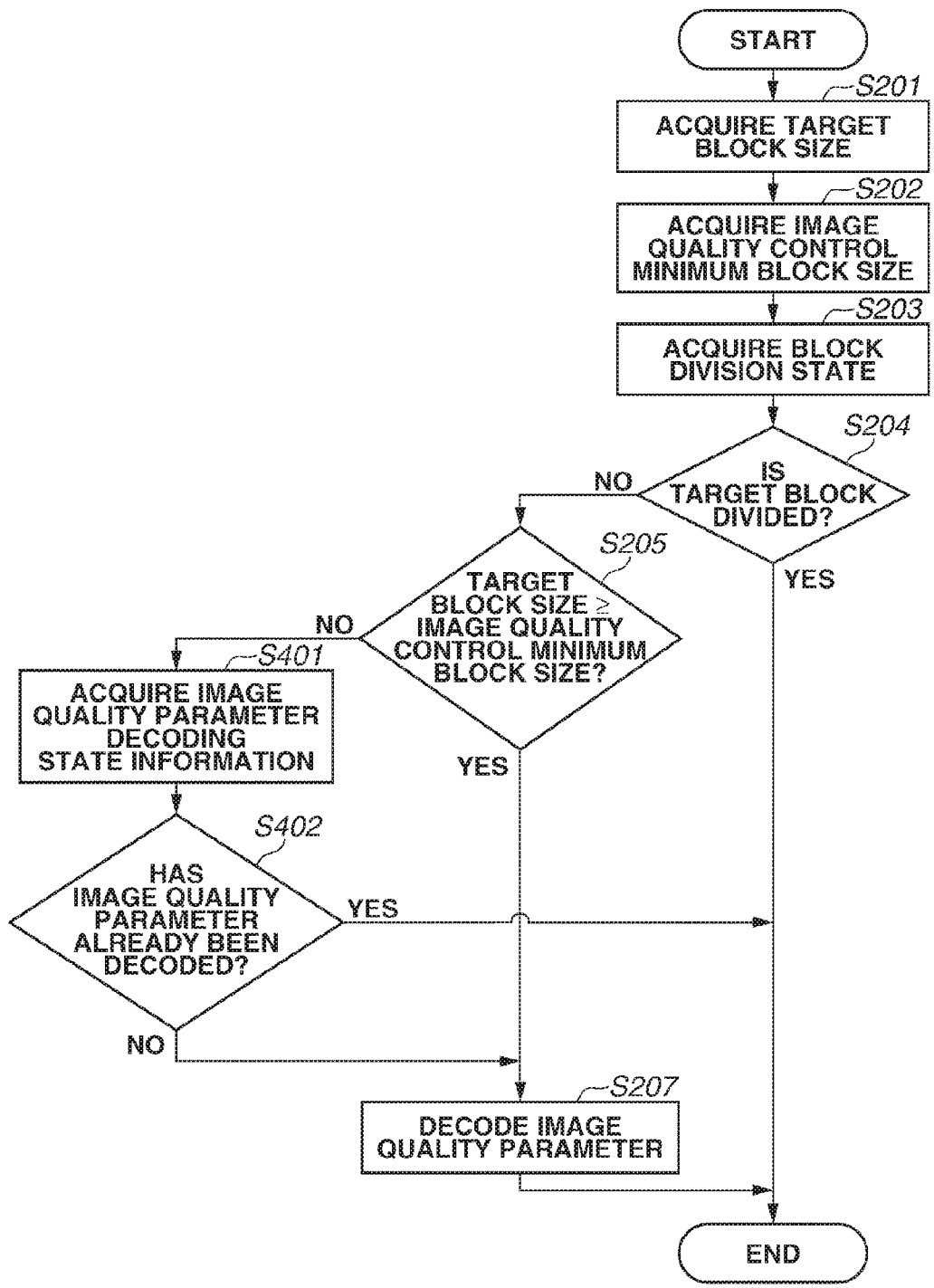

[Fig. 5]
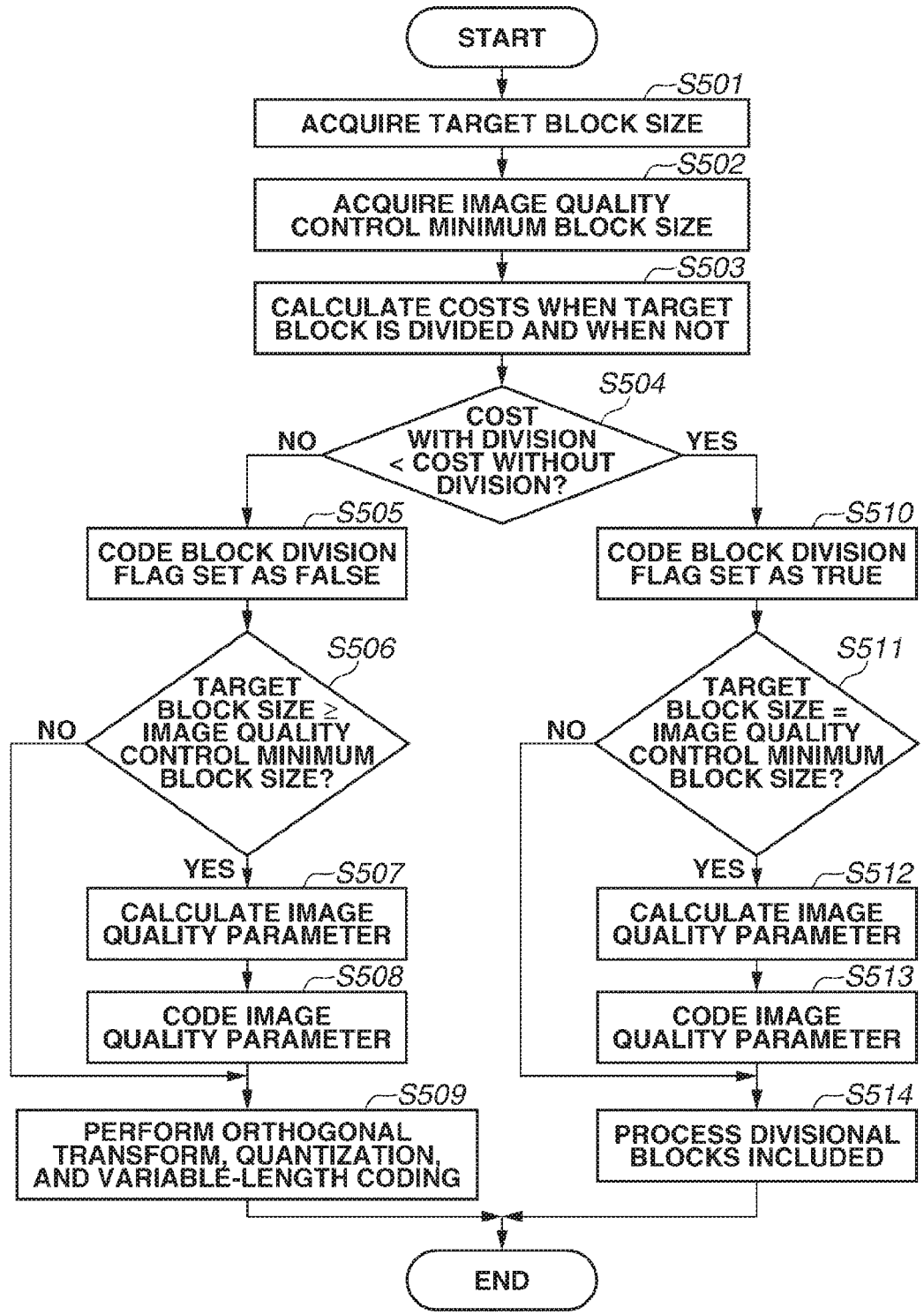

[Fig. 6]
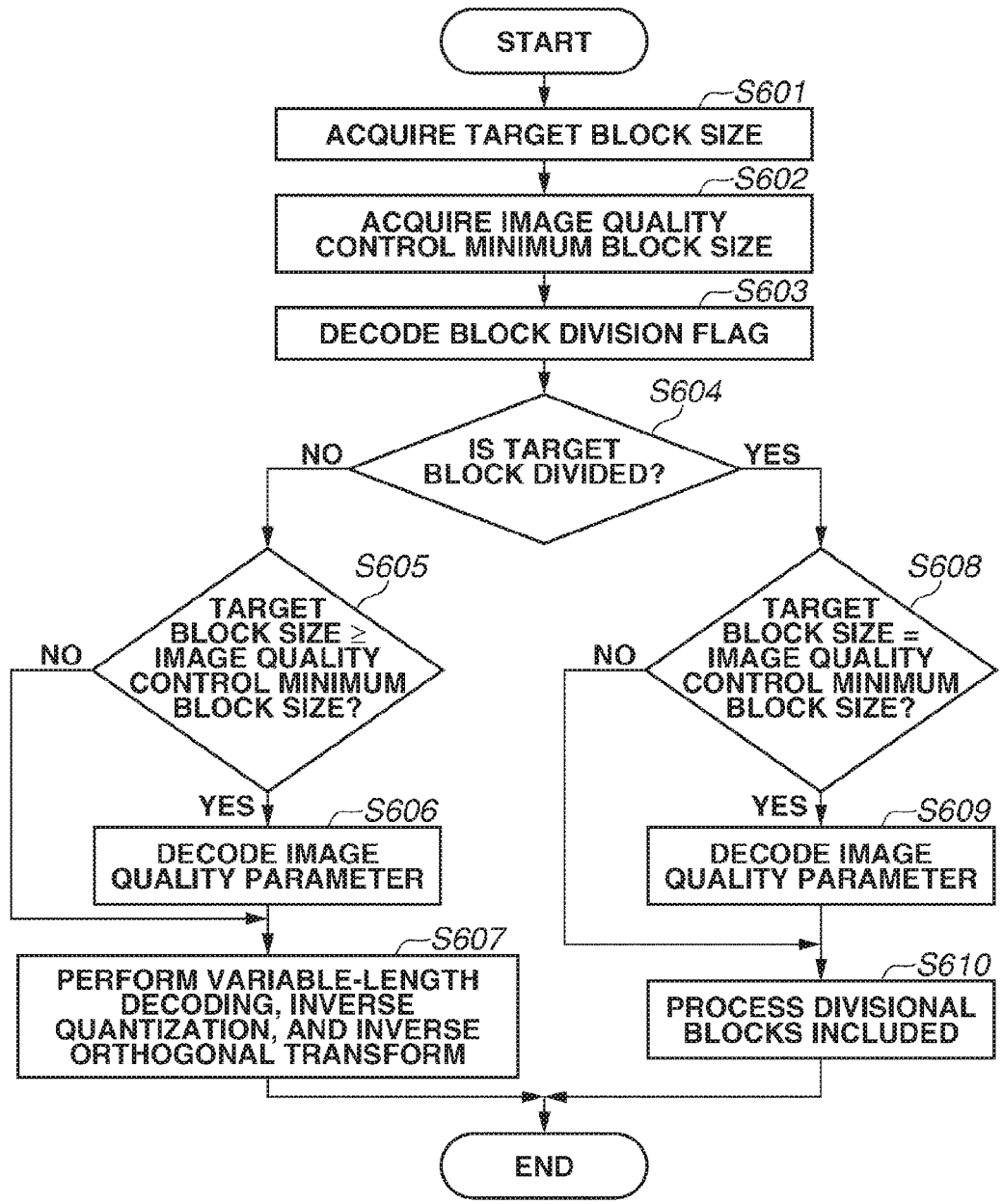

[Fig. 7]
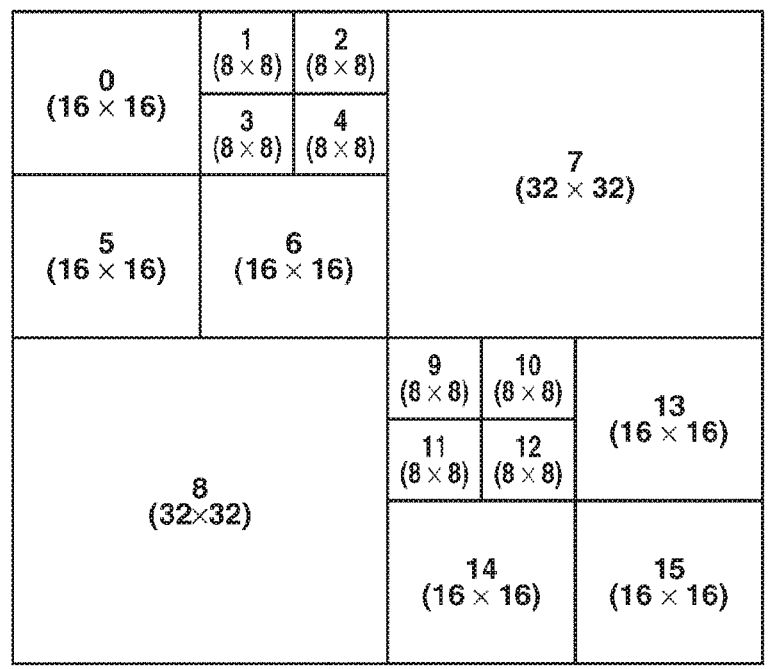
[Fig. 8A]
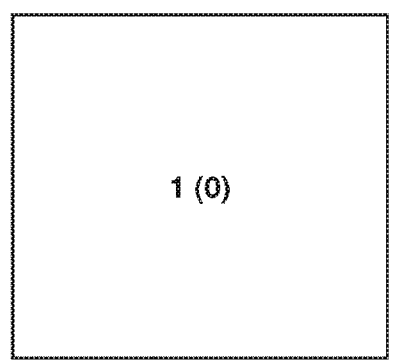
[Fig. 8B]
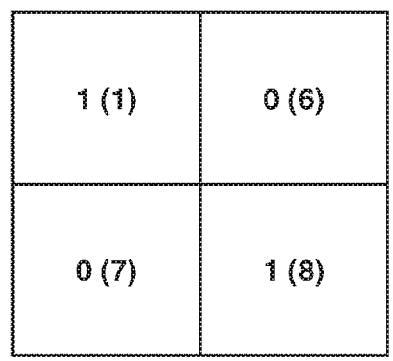

[Fig. 8C]
| 0 (2) | 1 (3) | |
|---|---|---|
| 0 (4) | 0 (5) | — |
| — | 1 (9) | 0 (10) |
| | 0 (11) | 0 (12) |
[Fig. 8D]
[Fig. 9]
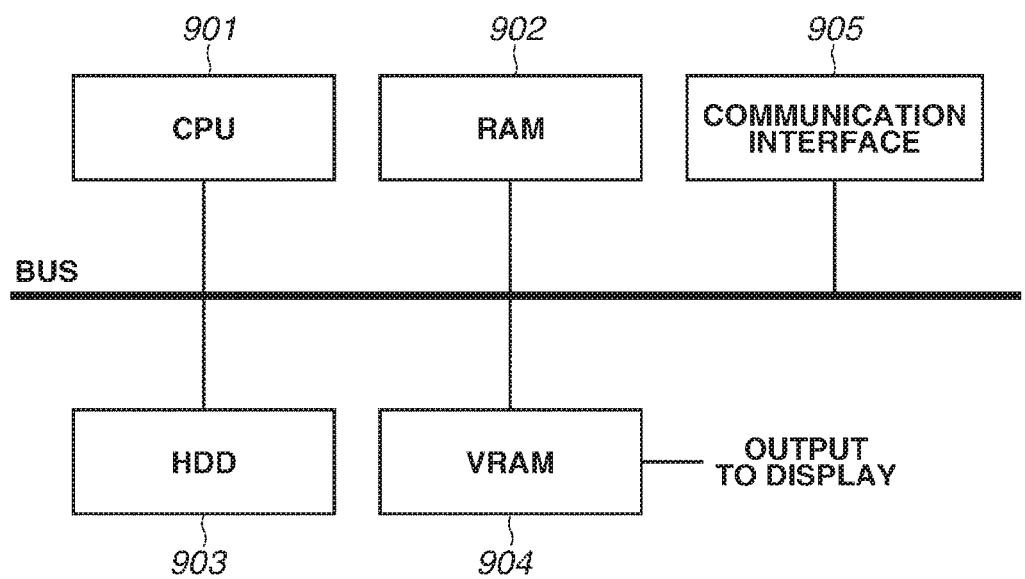

[Fig. 10]
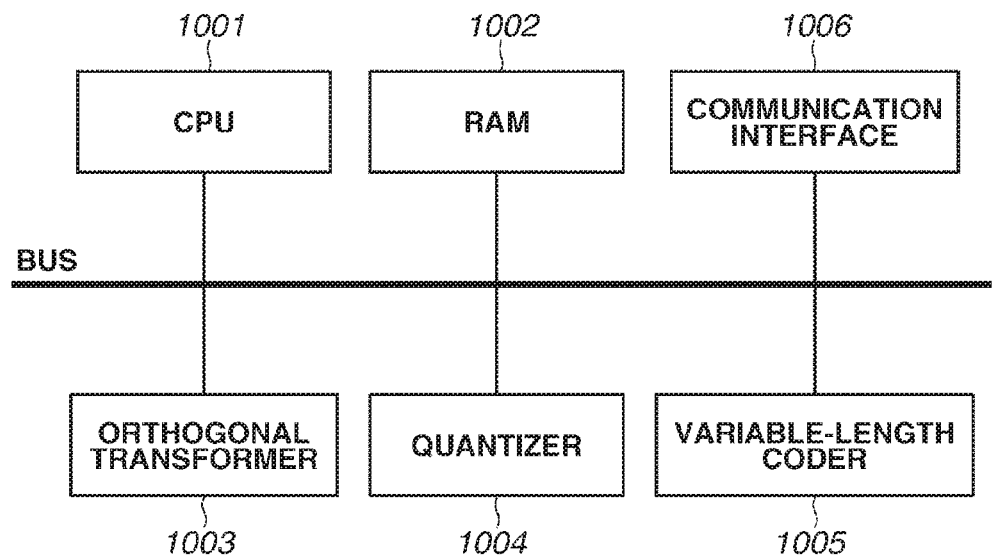
[Fig. 11]
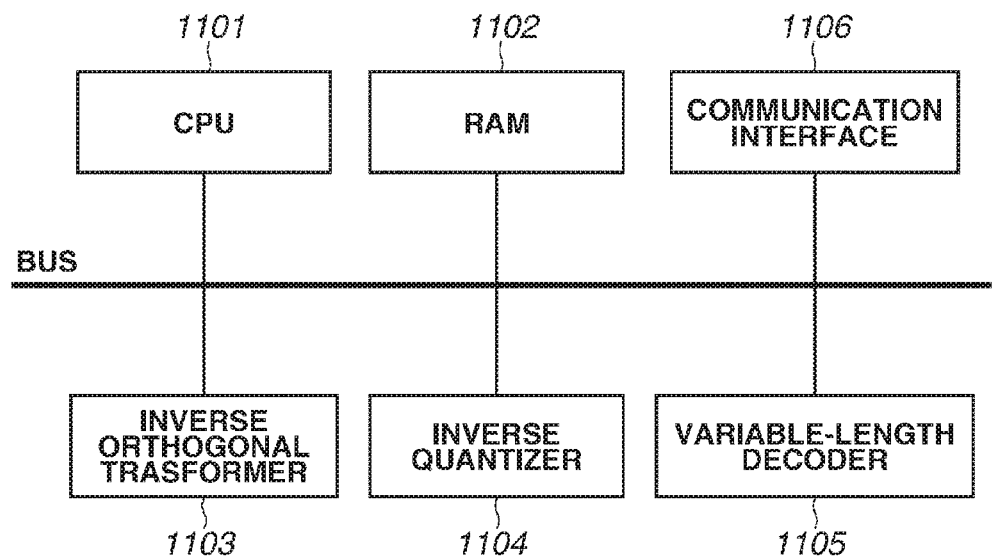

[Fig. 12A]
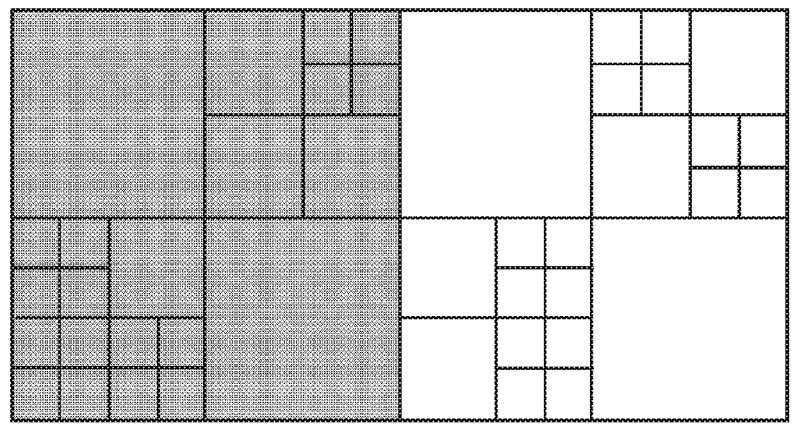
[Fig. 12B]
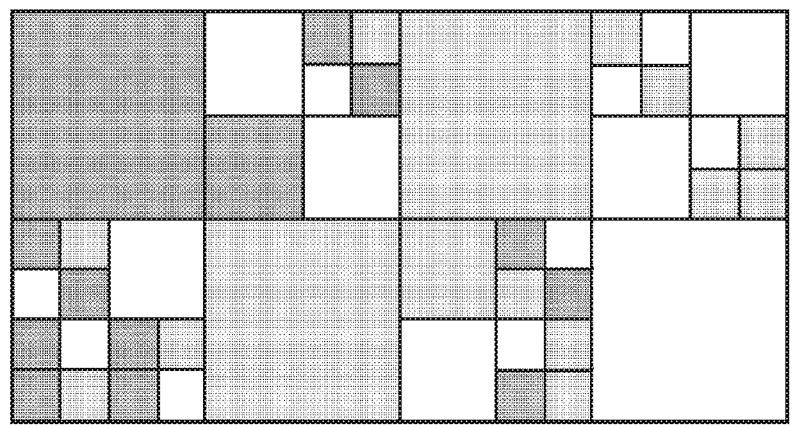
[Fig. 12C]
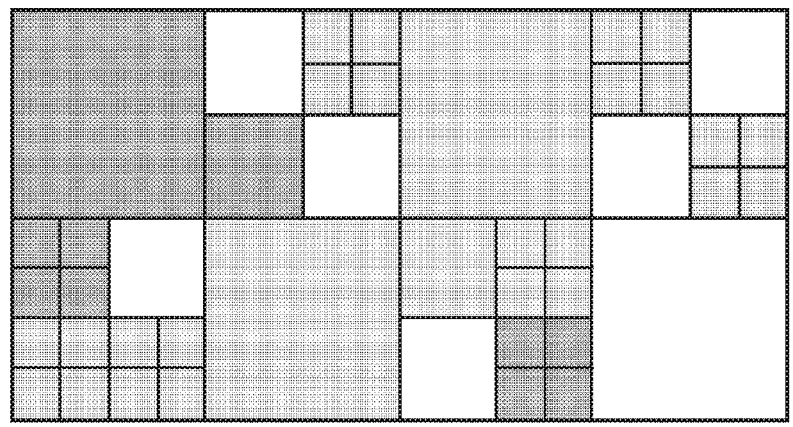
DARK GRAY: HIGH IMAGE QUALITY
LIGHT GRAY: LOW IMAGE QUALITY

[Fig. 13]
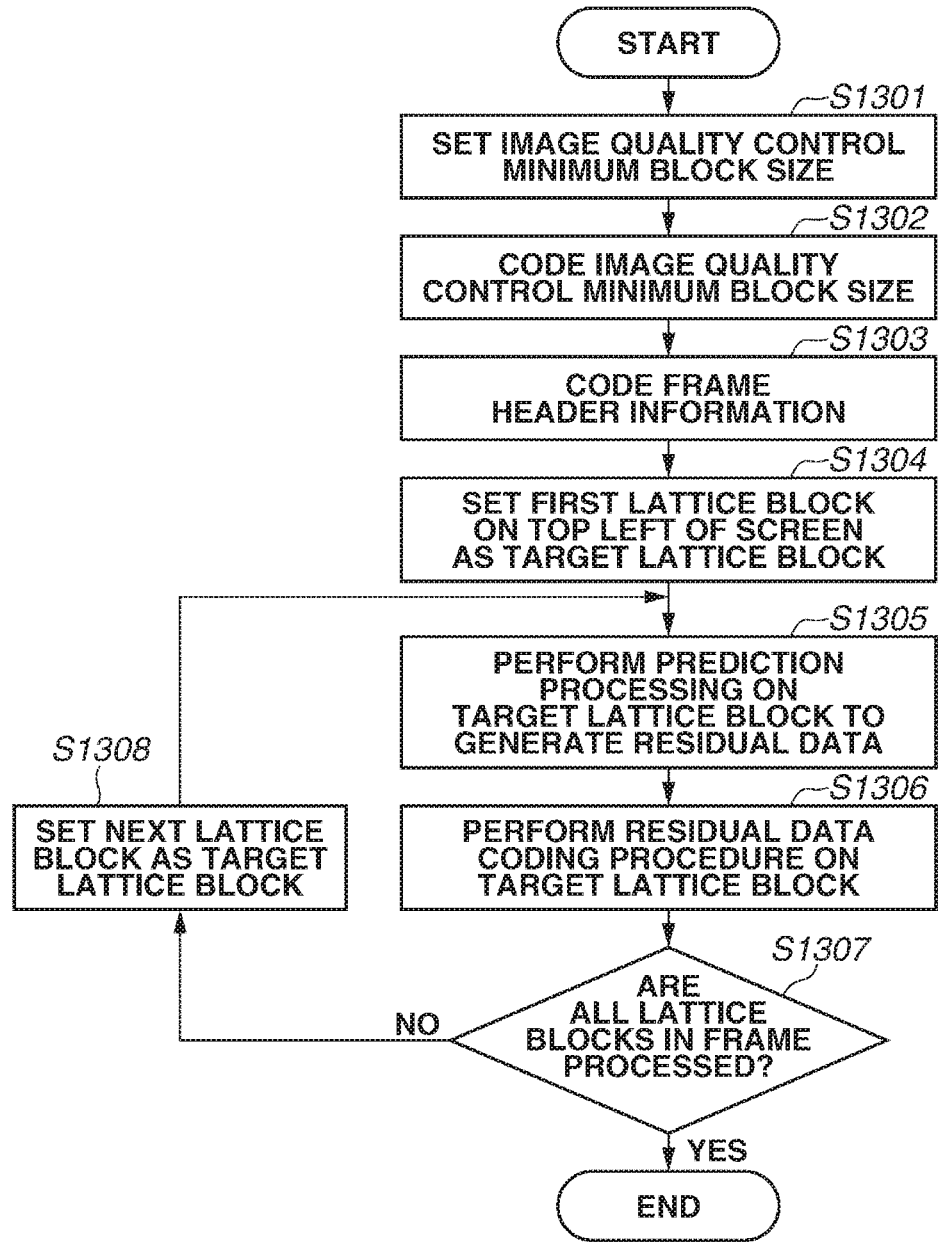

[Fig. 14]
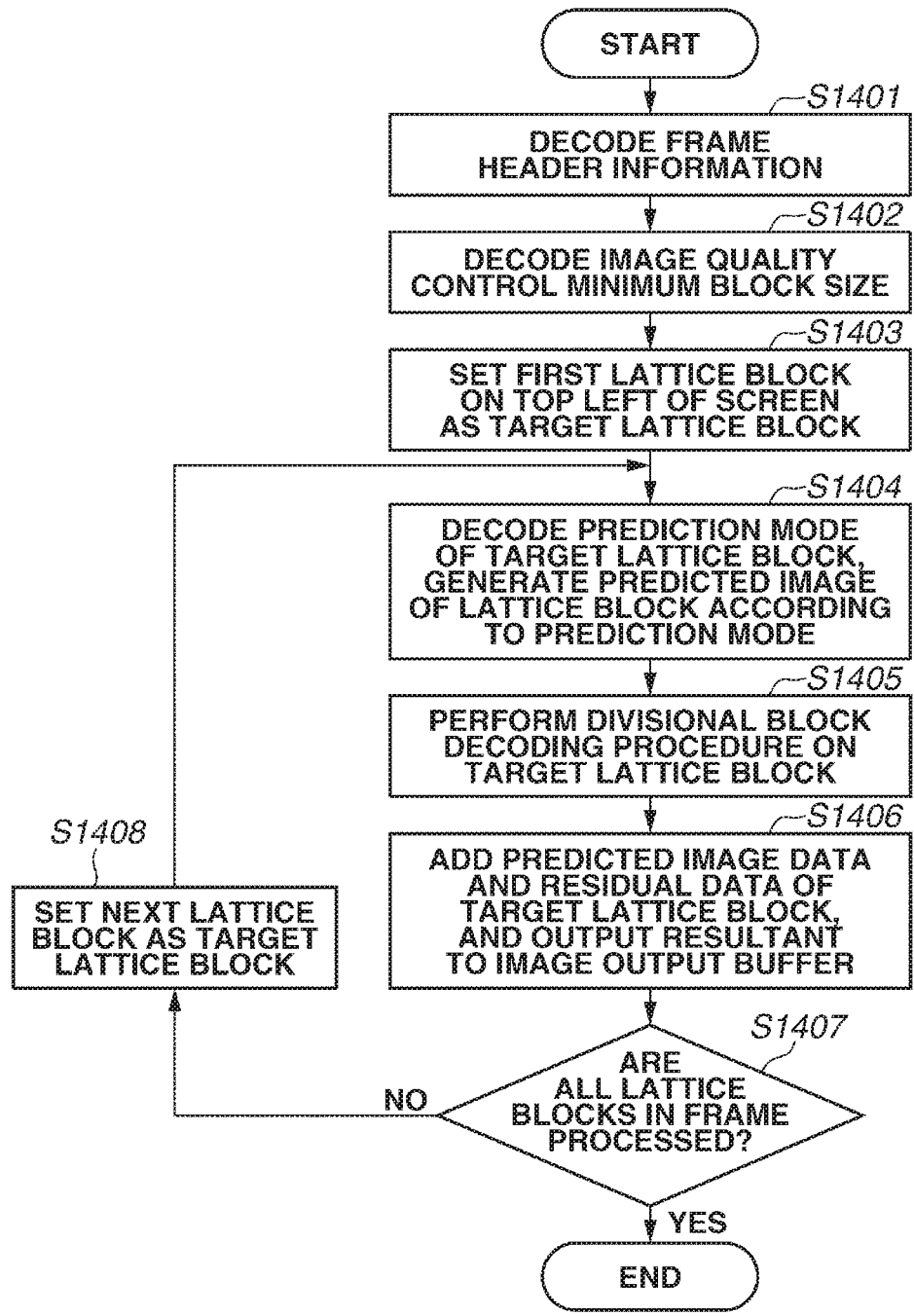

[Fig. 15]
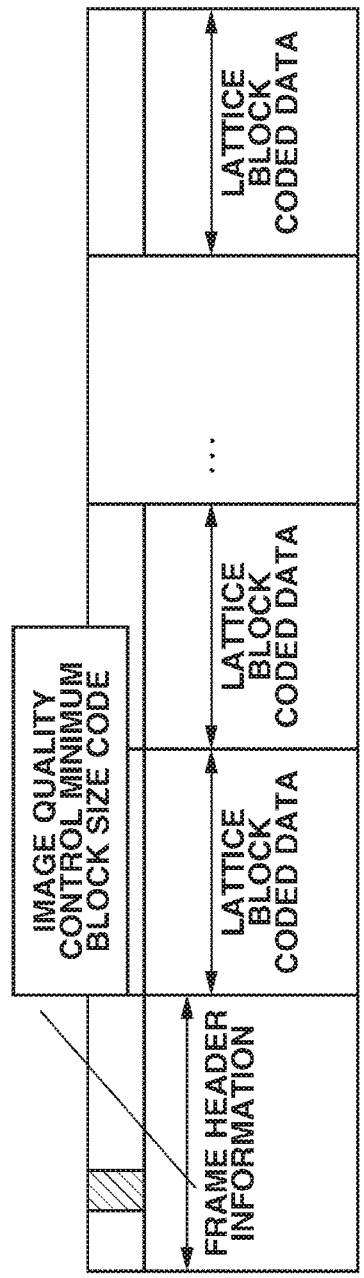

[Fig. 16]
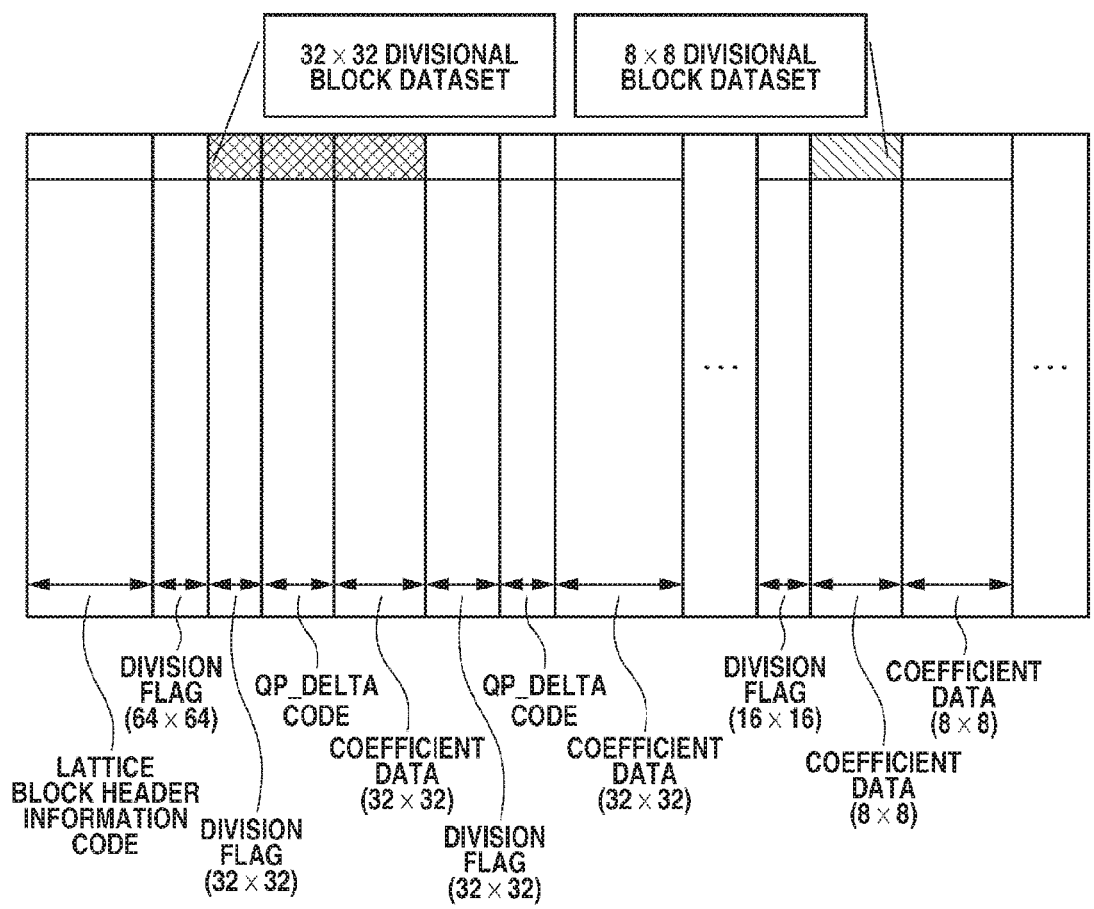

[Fig. 17]
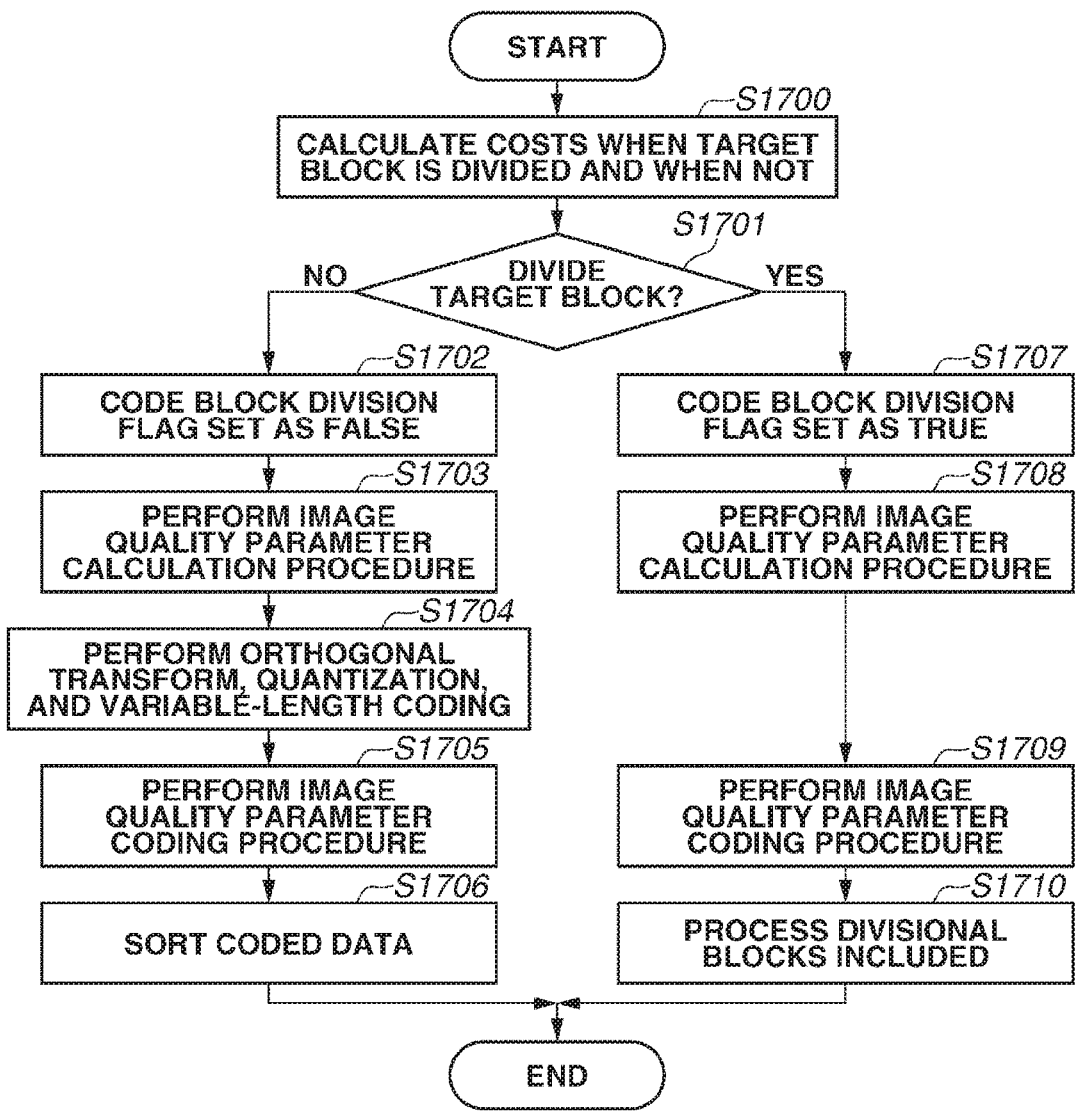

[Fig. 18]
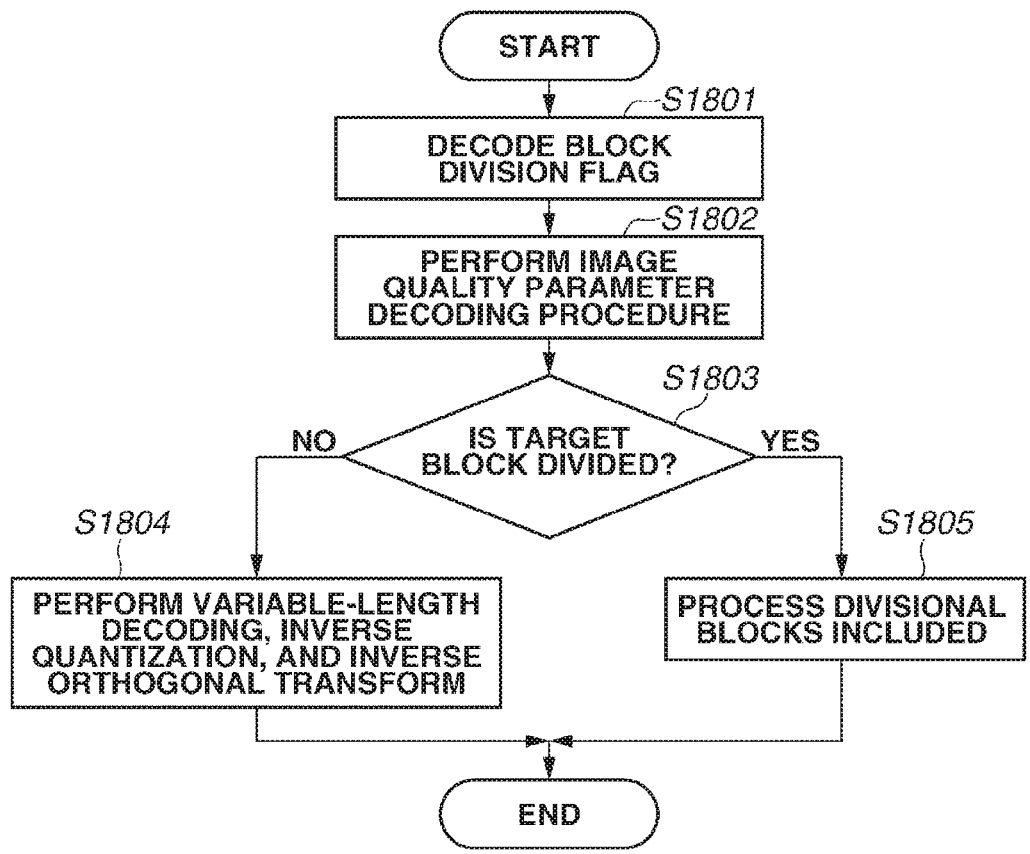

[Fig. 19]
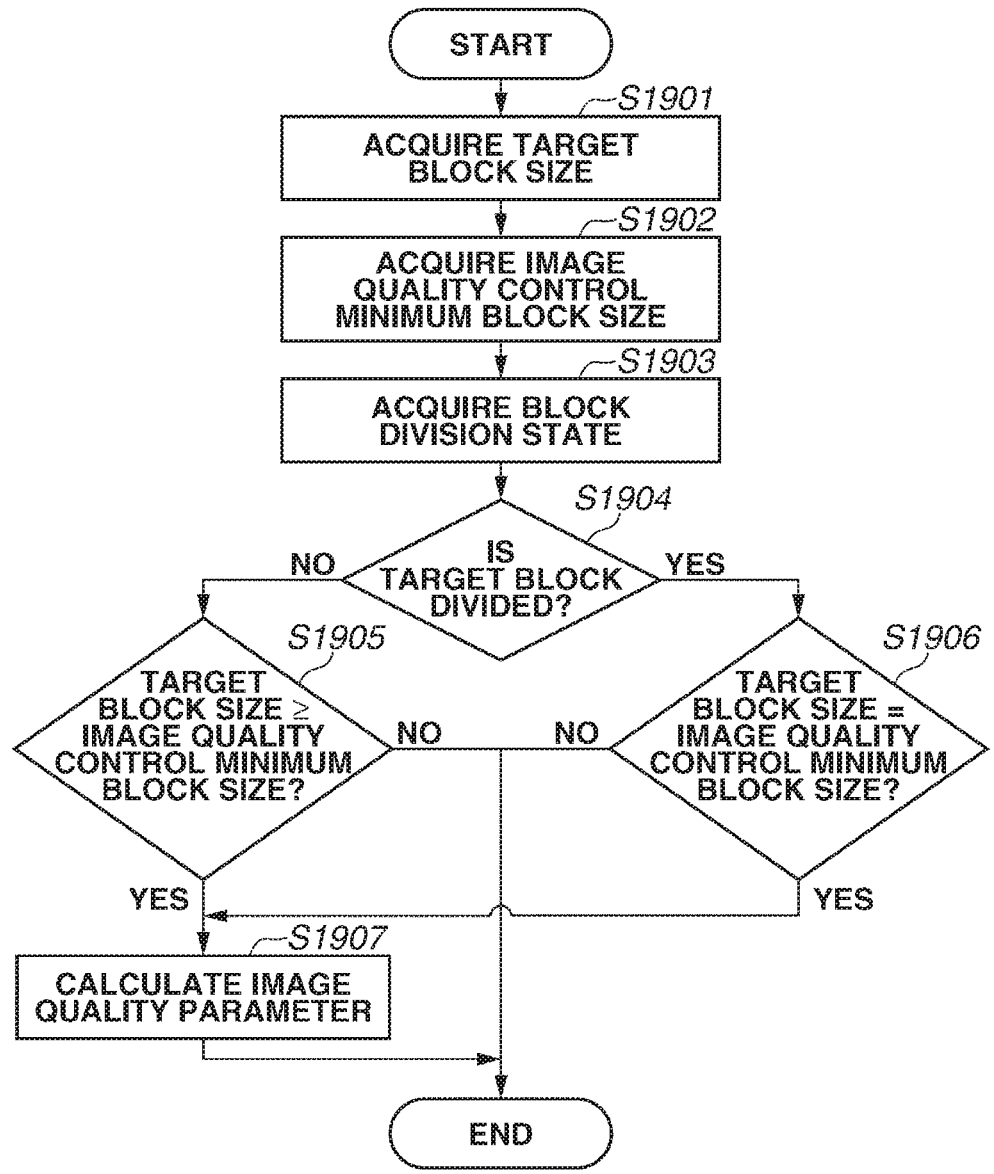

[Fig. 20]
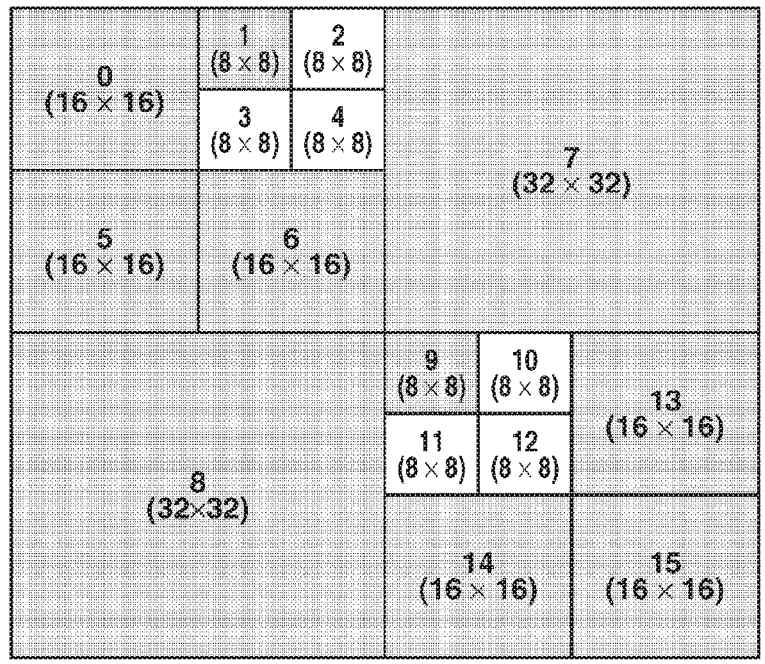
[Fig. 21A]
| LEVEL | MAXIMUM NUMBER OF LATTICE BLOCKS PER FRAME | MINIMUM VALUE OF IMAGE QUALITY CONTROL MINIMUM BLOCK SIZE | TARGET IMAGE SIZE |
|---|---|---|---|
| 1 | 80 | 8 | 640 × 480 |
| 2 | 510 | 16 | 1920 × 1080 |
| 3 | 2176 | 32 | 4096 × 2160 |
[Fig. 21B]
| LEVEL | MAXIMUM NUMBER OF LATTICE BLOCKS PER FRAME | MINIMUM VALUE OF IMAGE QUALITY CONTROL MINIMUM BLOCK SIZE | TARGET IMAGE SIZE |
|---|---|---|---|
| 1 | 80 | 8 | 640 × 480 |
| 2 | 510 | 8 | 1920 × 1080 |
| 3 | 2176 | 8 | 4096 × 2160 |

[Fig. 22]
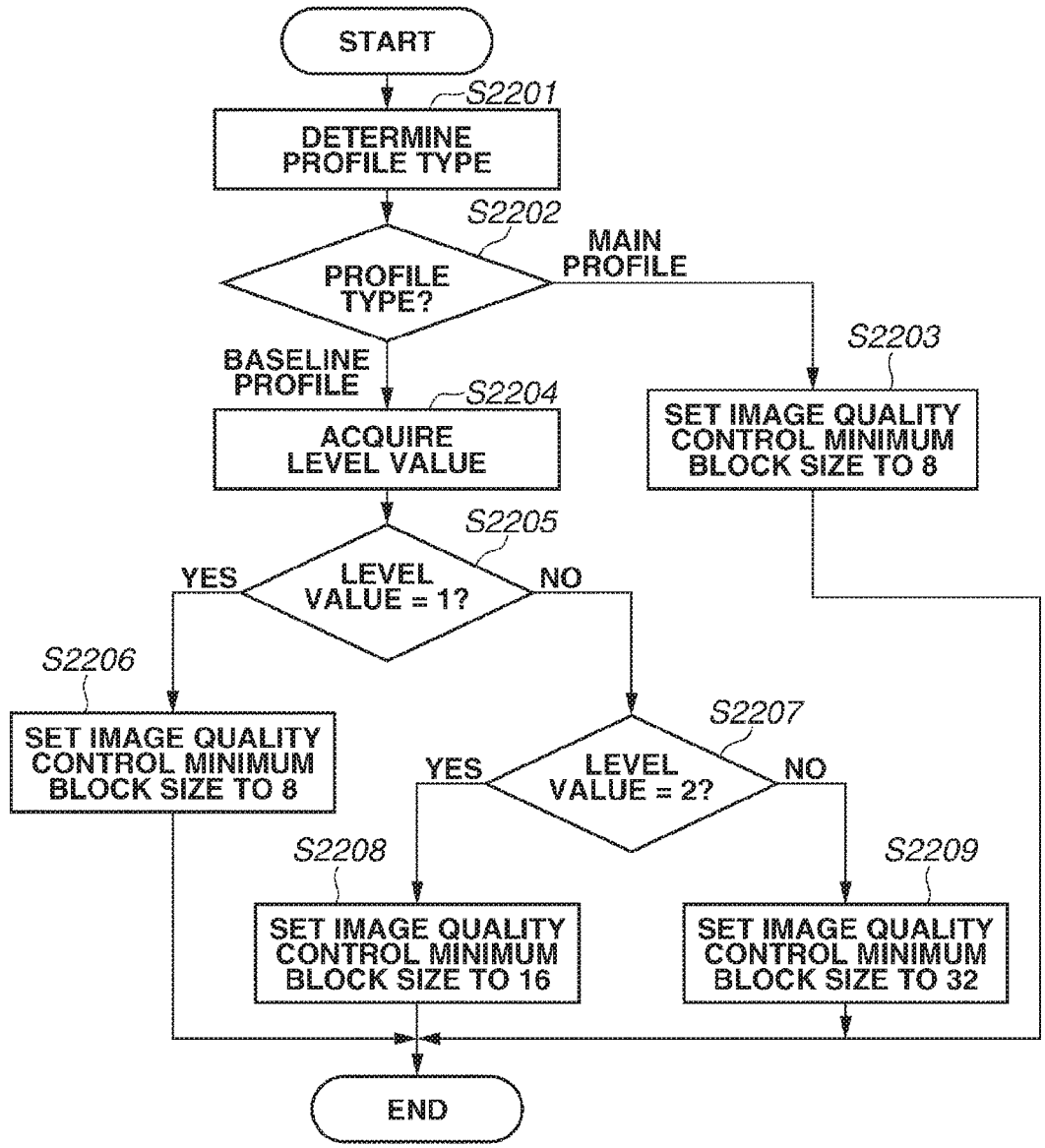

[Fig. 23A]
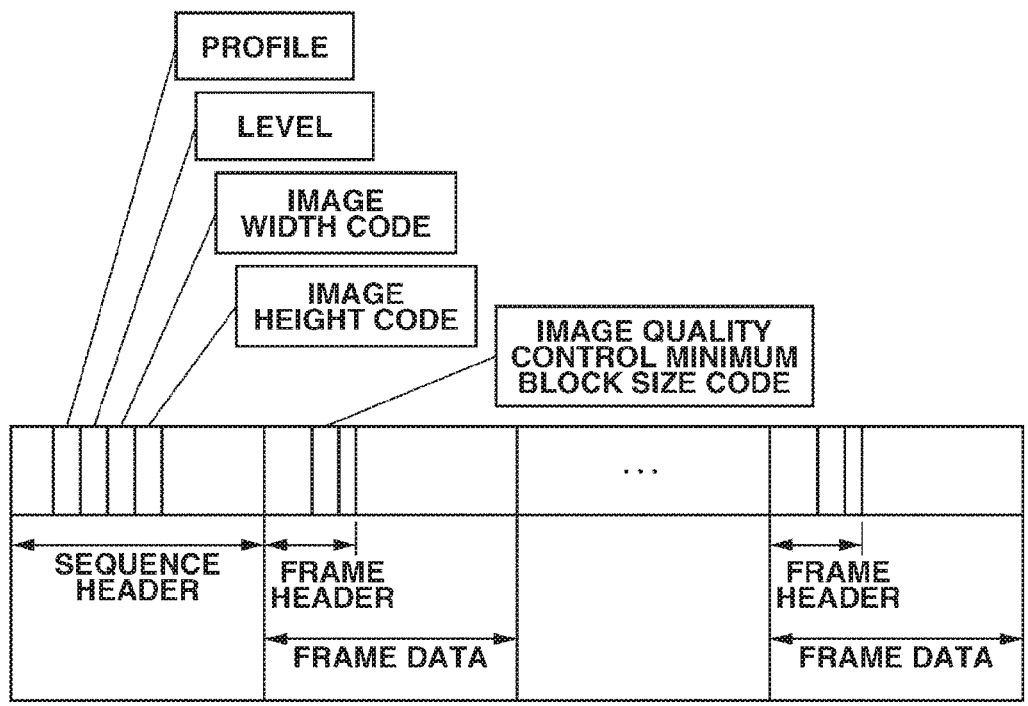
[Fig. 23B]
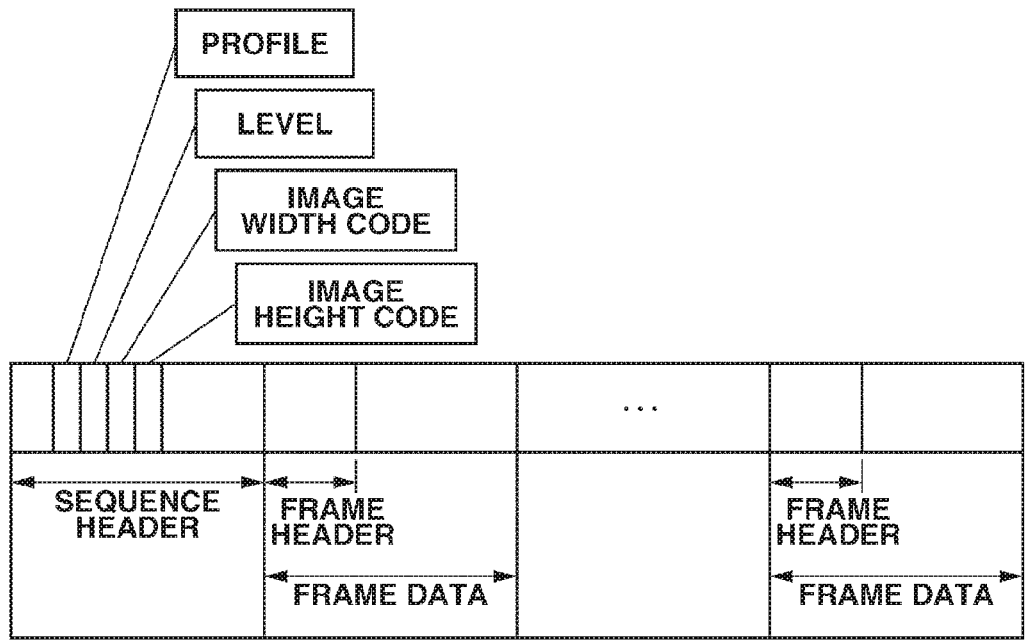

[Fig. 24]
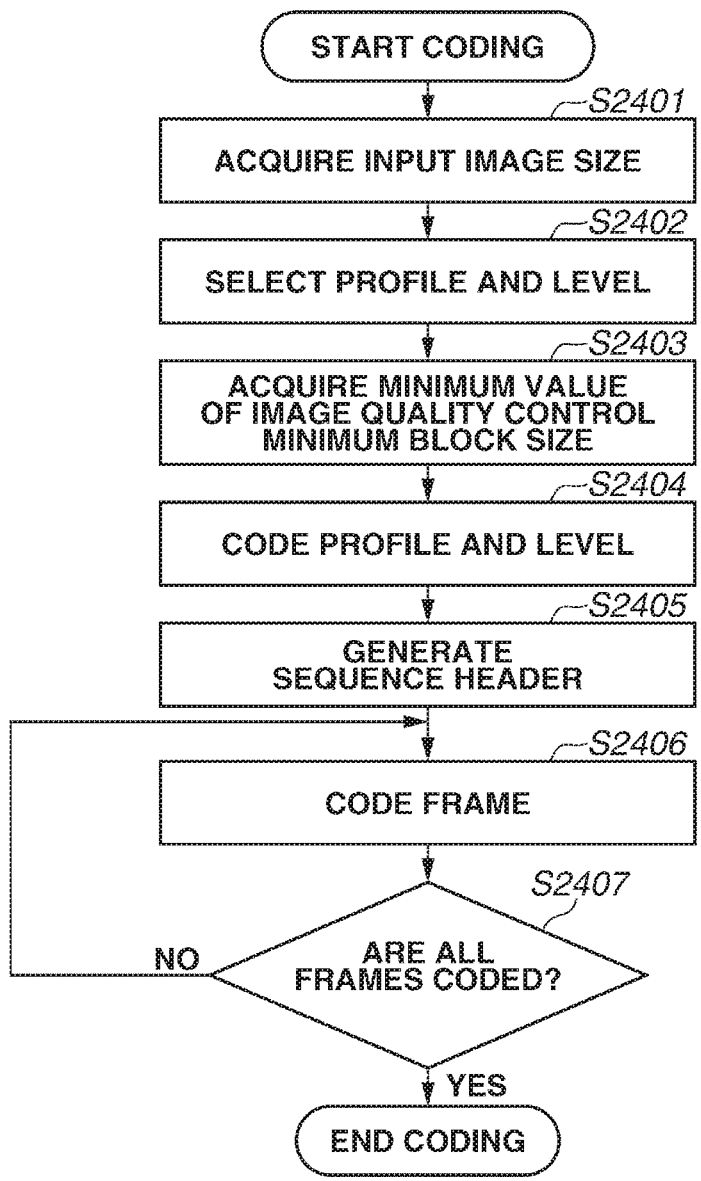

[Fig. 25]
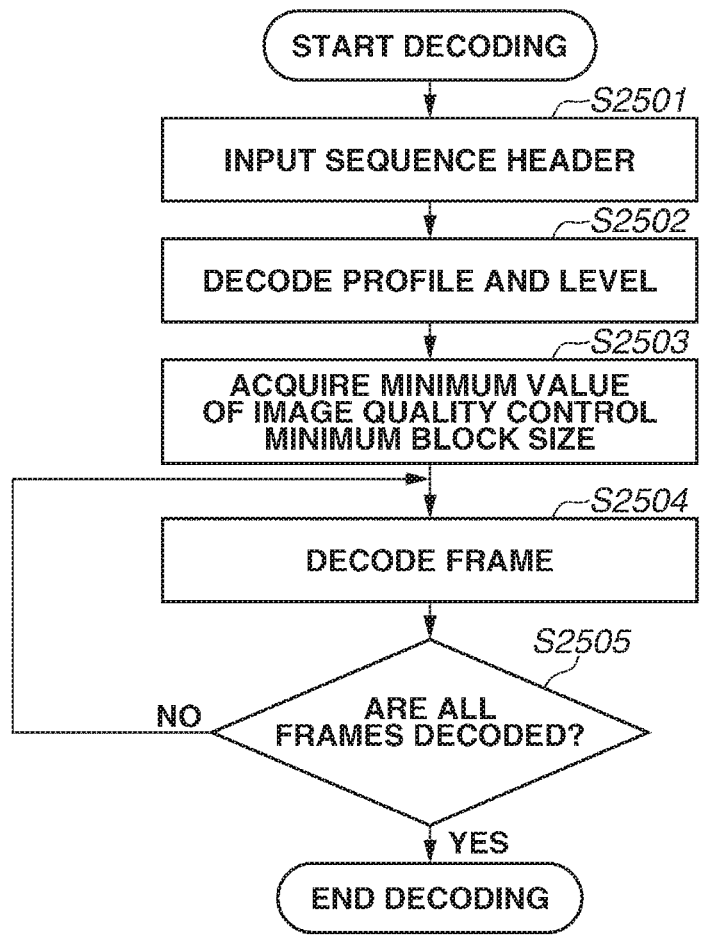

IMAGE CODING APPARATUS, IMAGE CODING METHOD, AND PROGRAM, PERTAINING TO AN IMAGE QUALITY PARAMETER, AND IMAGE DECODING APPARATUS, IMAGE DECODING METHOD, AND PROGRAM, PERTAINING TO AN IMAGE QUALITY PARAMETER

CROSS-REFERENCE TO RELATED APPLICATIONS

This application is a Continuation of co-pending U.S. patent application Ser. No. 13/979,617, filed on Jul. 12, 2013, which is a U.S. national stage application of International Patent Application No. PCT/JP2012/000151, filed on Jan. 12, 2012. These applications both claim the benefit of Japanese Application No. 2011-004648 filed Jan. 13, 2011. The above applications are hereby incorporated by reference herein in their entirety.

TECHNICAL FIELD

The present invention relates to an image coding apparatus, image coding method, and program, and an image decoding apparatus, image decoding method, and program. In particular, the present invention relates to an image quality parameter coding method and decoding method pertaining to calculation of an image quality parameter and insertion of code in image coding.

BACKGROUND ART

H.264/Moving Picture Experts Group (MPEG)-4 Advanced Video Coding (AVC), hereinafter referred to as H.264, has been known as a method of compression recording of a moving image. H.264 is widely used in one-segment digital terrestrial broadcasting and other applications. H.264 is characterized by the provision of a plurality of intra prediction capabilities, using integer transforms in units of 4×4 pixels in addition to conventional coding schemes (see ISO/IEC 14496-10: 2004 Information technology—Coding of audio-visual objects—Part 10: Advanced Video Coding, ITU-T H.264 Advanced video coding for generic audiovisual services).

Coding schemes using an orthogonal transform and quantization, typified by MPEG-2 and H.264, perform an orthogonal transform and quantization on predetermined block images to generate quantization coefficient data. For image quality control, the quantization is performed by using an image quality control parameter called quantization parameter. Specifically, quantization using a small quantization parameter value produces improved image quality but with a large amount of code. Quantization with a large quantization parameter value produces low image quality with a reduced amount of code. Optimum quantization parameter values are selected for coding according to a target amount of code. Such control is referred to as rate control. Various rate control methods have been discussed, including TM5. After the quantization, the quantization coefficient data is subjected to variable-length coding to generate coded coefficient data.

Quantization parameters are also coded to generate quantization parameter code. For example, H.264 uses a difference value between a quantization parameter that is used to quantize a block preceding a target block and a quantization parameter that is used to quantize the target block. The difference value is referred to as quantization parameter delta (QP_DELTA). QP_DELTA calculated is coded into QP_DELTA code by Golomb coding or arithmetic coding. For example, the QP_DELTA code codec by Golomb coding produces one bit of code even if the difference value is 0. The coded coefficient data and the quantization parameter code thus generated are transmitted to a decoder. The decoder decodes the coded coefficient data and the quantization parameter code to generate quantization coefficient data and quantization parameters. The decoder then performs inverse quantization and an inverse orthogonal transform on the quantization coefficient data by using the quantization parameters, thereby generating a decoded image.

A single unit of processing in MPEG-2 and H.264 is called a macroblock. Macroblocks are lattice blocks of 16×16 pixels into which an image is divided in a lattice pattern. In terms of pixels, blocks to be orthogonally transformed in MPEG-2 have a size of 8×8 pixels, and H.264 a size of 8×8 pixels or 4×4 pixels. That is, a single macroblock includes a plurality of orthogonal transform blocks. MPEG-2 and H.264 can control (rate control) quantization parameters in units of macroblocks. Orthogonal transform blocks included in the same macroblock are quantized with the same quantization parameter. According to an improved technology of H.264, an image is divided in a lattice pattern into lattice blocks called largest coding tree blocks (LCTBs). An LCTB has a size of 64×64 pixels. LCTBs are divided into blocks of smaller sizes called coding tree blocks (CTBs) by using a region quadtree structure. To search or input/output tree-structured data, the scan order needs to be specified. A CTB includes orthogonal transform blocks called transform units (TUs). TUs can also be divided into smaller sizes by using a region quadtree structure. Each unit has a division flag. A block having a division flag of true is structured to include four divisional blocks having a size ½ in height and width. A block having a division flag of false includes no divisional block and contains actual data on the block instead. In other words, only undivided TUs contain coefficient data on image blocks. An LCTB (lattice block) includes a plurality of hierarchically structured blocks of different orthogonal transform sizes. Whether to divide a block can be determined by various methods. One of the determination methods is discussed in Japanese Patent Application Laid-Open No. 2005-191706, which includes using Lagrange multipliers to calculate block costs and selecting a block division method of lower cost.

Suppose that an image coding method includes coding an image in units of lattice blocks into which the image is divided in a lattice pattern. If the lattice blocks are large in size and image quality control is performed in units of lattice blocks, boundaries between blocks of different image qualities may become noticeable.

Image quality parameters are coded and transmitted regardless of whether the image quality parameter changes. If lattice blocks are subdivided into smaller units for image quality control, there is a problem of overhead caused by the image quality parameter code.

SUMMARY OF INVENTION

The present invention is directed to an image coding apparatus which enables image quality control in units of appropriate blocks and can make block boundaries smaller to generate an image where the boundaries are less noticeable.

According to an aspect of the present invention, an image coding apparatus configured to divide an image into divisional blocks of a plurality of sizes and to perform coding on the image while controlling image quality according to a parameter value in units of divisional blocks includes a unit configured to acquire a block size of a target block to be coded, a unit configured to acquire a minimum block size used to control the parameter value, a unit configured to acquire a state of division of the target block, a unit configured to acquire the parameter value, a unit configured to determine whether the target block is divided according to the state of division of the target block, a unit configured to determine whether the block size of the target block is greater than or equal to the minimum block size, a unit configured to determine whether the block size of the target block is equal to the minimum block size, and a unit configured to code the acquired parameter value.

According to an exemplary embodiment of the present invention, it is possible to control image quality in units of appropriate blocks and make block boundaries smaller to generate an image where the boundaries are less noticeable. Since image quality control parameter code need not be inserted into all orthogonally transformed blocks, the amount of quantization parameter code will not increase more than necessary.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 1 is a flowchart illustrating a method of coding an image quality parameter according to a first exemplary embodiment of the present invention.

FIG. 2 is a flowchart illustrating a method of decoding an image quality parameter according to a second exemplary embodiment of the present invention.

FIG. 3 is a flowchart illustrating a method of coding an image quality parameter according to a third exemplary embodiment of the present invention.

FIG. 4 is a flowchart illustrating a method of decoding an image quality parameter according to a fourth exemplary embodiment of the present invention.

FIG. 5 is a flowchart illustrating a method of coding an image quality parameter according to a fifth exemplary embodiment of the present invention.

FIG. 6 is a flowchart illustrating a method of decoding an image quality parameter according to a sixth exemplary embodiment of the present invention.

FIG. 7 is a diagram illustrating an example of a lattice block divided.

FIG. 8A is a diagram illustrating an example of division of a lattice block and a division flag.

FIG. 8B is a diagram illustrating an example of division of a lattice block and division flags.

FIG. 8C is a diagram illustrating an example of division of a lattice block and division flags.

FIG. 8D is a diagram illustrating an example of division of a lattice block and division flags.

FIG. 9 is a diagram illustrating an example of a hardware configuration for performing a coding method and a decoding method according to an exemplary embodiment of the present invention.

FIG. 10 is a diagram illustrating an example of a hardware configuration for performing a coding method according to an exemplary embodiment of the present invention.

FIG. 11 is a diagram illustrating an example of a hardware configuration for performing a decoding method according to an exemplary embodiment of the present invention.

FIG. 12A is a diagram illustrating an example of image quality control on divisional blocks.

FIG. 12B is a diagram illustrating an example of image quality control on divisional blocks.

FIG. 12C is a diagram illustrating an example of image quality control on divisional blocks.

FIG. 13 is a flowchart illustrating a method of coding processing on a frame.

FIG. 14 is a flowchart illustrating a method of decoding processing on a frame.

FIG. 15 is a diagram illustrating the data structure of a coded frame.

FIG. 16 is a diagram illustrating the data structure of coded data on a lattice block.

FIG. 17 is a flowchart illustrating details of a method of coding divisional blocks.

FIG. 18 is a flowchart illustrating details of a method of decoding divisional blocks.

FIG. 19 is a flowchart illustrating a method of calculating an image quality parameter according to the first exemplary embodiment.

FIG. 20 is a diagram illustrating divisional blocks to be accompanied by quantization parameters.

FIG. 21A is a diagram illustrating a relationship among a profile, a level, and an image quality control minimum block size.

FIG. 21B is a diagram illustrating a relationship among a profile, a level, and an image quality control minimum block size.

FIG. 22 is a flowchart illustrating a procedure for calculating an image quality control minimum block size.

FIG. 23A is a diagram illustrating a structure of coded data of a sequence.

FIG. 23B is a diagram illustrating a structure of coded data of a sequence.

FIG. 24 is a flowchart illustrating an image coding method according to a seventh exemplary embodiment of the present invention.

FIG. 25 is a flowchart illustrating an image decoding method according to an eighth exemplary embodiment of the present invention.

DESCRIPTION OF EMBODIMENTS

Various exemplary embodiments, features, and aspects of the invention will be described in detail below with reference to the drawings.

A method of coding divisional blocks according to a first exemplary embodiment of the present invention will be described with reference to FIGS. 1, 9, 13, 17, and 19.

FIG. 9 illustrates a configuration for executing a coding program that includes the method of coding according to the present exemplary embodiment. The coding program is recorded on a hard disk device (hereinafter, abbreviated as HDD) 903. The coding program is loaded into a random-access memory (RAM) 902 upon activation. A central processing unit (CPU) 901 performs the steps to be described below to perform image coding processing. In the present exemplary embodiment, input image data is stored in and read from the HDD 903. Output data is recorded on the HDD 903.

A coding operation of the foregoing configuration will be described. FIG. 13 is a flowchart illustrating a procedure for coding an entire frame. The present exemplary embodiment deals with a case where screens are each divided in a lattice pattern into lattice blocks of 64×64 pixels and sequentially processed in units of lattice blocks. Lattice blocks within a screen are processed in a raster scan order. It should be noted that the lattice block size is not limited to 64.

In step S1301, the CPU 901 sets an image quality control minimum block size. In step S1302, the CPU 901 codes the image quality control minimum block size. In step S1303, the CPU 901 codes frame header information. In step S1304, the CPU 901 sets a first lattice block on the top left of the screen as a target lattice block. In step S1305, the CPU 901 performs prediction processing on the target lattice block to generate residual data. In step S1306, the CPU 901 performs a procedure for coding residual data on the target lattice block. In step S1307, the CPU 901 determines whether all lattice blocks in the frame are processed. In step S1308, the CPU 901 sets the next lattice block as a target lattice block.

The procedure of the steps will be described below. In step S1301, the CPU 901 sets a parameter called image quality control minimum block size. The present exemplary embodiment will be described on the assumption that image quality is controlled by a quantization parameter that is used to quantize orthogonal transform coefficients. The image quality control minimum block size is 16×16 pixels, so that image quality control minimum block size information has a value of 16. However, the value is not limited to 16. The program developer may embed a fixed value in the program. The user may specify a value via a user interface of the program. The program itself may calculate and set an optimum value. The program may calculate optimum values depending on input images. For example, if an input image is greater than 640×480 pixels, the program may set the image quality control minimum block size to a value as large as 16. If resolution is lower than or equal to 640×480 pixels, the program may set the image quality control minimum block size to a value as small as 8.

In step S1302, the CPU 901 codes the image quality control minimum block size set in step S1301 to generate image quality control minimum block size code. For example, the CPU 901 may provide an index that expresses image quality control minimum block size information of 64 as "0," and similarly 32, 16, and 8 as "1," "2," and "3," respectively. Then, the CPU 901 may generate a fixed-length code that represents the index.

In step S1303, the CPU 901 generates and codes frame header information. The CPU 901 includes the image quality control minimum block size code generated in step S1302 as a part of the frame header information. Note that, while the present exemplary embodiment deals with the case where the image quality control minimum block size code is included in a frame header, this is not restrictive. Image quality control minimum block size code may be included in a sequence, a picture, a slice, or a block of highest hierarchical level.

In step S1304, the CPU 901 sets a lattice block on the top left of the screen as a first target lattice block to be processed.

In step S1305, the CPU 901 generates a predicted image by using intra-frame prediction and motion compensation prediction, and generates residual data from the pixels of the target lattice block. The intra-frame prediction includes generating a predicted image by referring to the vicinity of the target lattice block. The motion compensation prediction includes generating a predicted image by referring to pixels in other frames. Examples include intra prediction and motion compensation prediction that are adopted in the H.264 coding scheme mentioned previously. The CPU 901 codes an intra-frame prediction mode and/or motion vectors generated, and outputs the resultant to an output buffer as lattice block header information code.

In step S1306, the CPU 901 performs a procedure for coding residual data in a block, which will be described in conjunction with FIG. 17, on the target lattice block. FIG. 17 will be described in detail below.

In step S1307, the CPU 901 determines whether all lattice blocks in the frame are processed. If all the lattice blocks are processed (YES in step S1307), the CPU 901 ends the coding processing on the entire frame. If not all the lattice blocks are processed yet (NO in step S1307), the CPU 901 performs step S1308.

In step S1308, the CPU 901 sets the next lattice block in a raster scan order as a target lattice block, and returns to step S1305.

FIG. 17 is a detailed flowchart of step S1306. In step S1306, the CPU 901 codes a plurality of hierarchically structured orthogonal transform blocks of different sizes to generate coded data which includes image quality control parameter code. Specifically, the CPU 901 performs block division, an orthogonal transform, and quantization based on an image quality control minimum block size, block size data, and residual data on blocks. The flowchart also illustrates processing for coding divisional blocks to generate block division flag code, coded coefficient data, and QP_DELTA code pertaining to updating of an image quality parameter. The present exemplary embodiment uses a region quadtree structure for hierarchical structuring. Blocks at the highest hierarchical level are lattice blocks of 64×64 pixels. As the level descends by division processing, blocks of 32×32 pixels, 16×16 pixels, and as small as 8×8 pixels can be processed. The region quadtree-based block division structure can be transmitted to a decoder side by block division flags being embedded in a stream.

In step S1700, the CPU 901 calculates costs when a target block is divided and when not. In step S1701, the CPU 901 determines whether to divide the target block. In step S1702, the CPU 901 codes a block division flag set as false and outputs the resultant. In step S1703, the CPU 901 performs a procedure for calculating an image quality parameter. In step S1704, the CPU 901 performs an orthogonal transform, quantization, and variable-length coding. In step S1705, the CPU 901 performs a procedure for coding the image quality parameter. In step S1706, the CPU 901 sorts coded data and outputs the resultant to an output buffer. In step S1707, the CPU 901 codes a block division flag set as true and outputs the resultant. In step S1708, the CPU 901 performs the procedure for calculating an image quality parameter. In step S1709, the CPU 901 performs the procedure for coding the image quality parameter. In step S1710, the CPU 901 processes divisional blocks included.

The procedure of the steps will be described below. In step S1700, the CPU 901 calculates costs when the block is divided and when not. The costs may be calculated by using Lagrange multipliers mentioned above, as well as image characteristics, statistics, and predicted code lengths.

In step S1701, the CPU 901 compares the costs with and without division, calculated in step S1700. If the cost with block division is lower than the cost without block division (YES in step S1701), the CPU 901 determines the comparison to be true. If not (NO in step S1701), the CPU 901 determines the comparison to be false. If the determination result in step S1701 is false (NO in step S1701), the CPU 901 performs steps S1702 to S1706. If the determination result in step S1701 is true (YES in step S1701), the CPU 901 performs steps S1707 to S1710.

Description will initially be given of the case where the cost is lower without block division. In step S1702, the CPU 901 codes a block division flag set as false. The CPU 901 typically assigns and codes, though not limited to, a one-bit value of 0.

In step S1703, the CPU 901 performs an image quality parameter calculation procedure illustrated in FIG. 19 to calculate an image quality parameter. FIG. 19 will be described in detail below.

In step S1704, the CPU 901 performs an orthogonal transform, quantization, and variable-length coding on residual data to generate coded coefficient data. The orthogonal transform is implemented by a discrete cosine transform (DCT). The quantization is performed by using the image quality parameter calculated in step S1703. The CPU 901 performs the quantization by using the same image quality parameter value as that used for the previous quantization if no new image quality parameter is calculated by the image quality parameter calculation procedure illustrated in FIG. 19 to be described below. For variable-length coding, the CPU 901 may use Huffman coding and arithmetic coding. Such coding techniques can be implemented by using methods similar to those of H.264 mentioned previously.

In step S1705, the CPU 901 performs the image quality parameter coding procedure. The image quality parameter coding procedure will be described in detail below with reference to FIG. 1.

In step S1706, the CPU 901 sorts block division flag code, QP_DELTA code, and coded coefficient data, and outputs the resultant to an output buffer in this order. If there is no coded data to output, the CPU 901 only sorts and outputs existing coded data. FIG. 16 illustrates an example of the code order.

Now, description will be given of the case where the cost is lower with block division. In step S1707, the CPU 901 codes a block division flag set as true. The CPU 901 typically assigns and codes, though not limited to, a one-bit value of 1.

In step S1708, the CPU 901 performs the image quality parameter calculation procedure illustrated in FIG. 19 to be described below, thereby calculating an image quality parameter.

In step S1709, the CPU 901 performs the image quality parameter coding procedure as in step S1705. The image quality parameter coding procedure will be described in detail below with reference to FIG. 1.

In step S1710, the CPU 901 recursively performs the present procedure on all divisional blocks included, i.e., four divisional blocks (upper left, upper right, lower left, and lower right) that are included in the hierarchically subsequent level. The divisional blocks each have a size ½ that of the original target block both in height and width. The target block size decreases division after division. The recursive processing may be performed up to a block size as small as 8×8 pixels. By such recursive processing, a lattice block is successively divided into a region quadtree structure. For example, suppose that a lattice block is divided as illustrated in FIG. 7. A division flag for indicating the presence or absence of block division will be denoted by 1 when a corresponding block is divided, and 0 when not. The division flags on the respective divisional blocks are then expressed as illustrated in FIGS. 8A, 8B, 8C, and 8D. FIGS. 8A, 8B, 8C, and 8D illustrate the levels and blocks of 64×64 pixels, 32×32 pixels, 16×16 pixels, and 8×8 pixels, respectively. The numerals indicate division flags. "-" indicates that no flag is needed. The parenthesized numerals indicate structural order. In the present exemplary embodiment, the structural order refers to the order of upper left, upper right, lower left, and lower right in terms of blocks. In terms of levels, the structural order refers to the forward order of scanning of the region quadtree structure. Sets of division flag code, QP_DELTA code, and coded coefficient data are stored in the structural order. No division flag is set on blocks of 8×8 pixels since such blocks will not be divided further. A block having a division flag of 1 contains no coefficient data itself since such a block is subdivided into divisional blocks of smaller size which contain coefficient data. As illustrated in FIG. 16 to be described below, a stream has a data structure such that pieces of coded information on respective divisional blocks are arranged in the structural order. A piece of coded information on each divisional block includes a set of division flag code, QP_DELTA code, and/or coefficient data on the divisional block.

FIG. 1 is a detailed flowchart of the image quality parameter coding procedure performed in steps S1705 and S1709. In step S101, the CPU 901 acquires a target block size. In step S102, the CPU 901 acquires an image quality control minimum block size. In step S103, the CPU 901 acquires the state of division of the block. In step S104, the CPU 901 determines whether the target block is divided. In step S105, the CPU 901 determines whether the target block size is greater than or equal to the image quality control minimum block size. In step S106, the CPU 901 determines whether the target block size is equal to the image quality control minimum block size. In step S107, the CPU 901 acquires an image quality parameter. In step S108, the CPU 901 codes the image quality parameter.

The procedure of the steps will be described below. In step S101, the CPU 901 acquires a target block size. Immediately after the present procedure is called from the procedure of FIG. 17, the target block to be processed is a lattice block itself. The value of the target block size is thus 64. As the level of the region quadtree structure descends subsequently due to recursive calls, the size value changes to 32, 16, and 8.

In step S102, the CPU 901 acquires an image quality control minimum block size that is set from outside. In the present exemplary embodiment, the value of the image quality control minimum block size is 16. Whether the target block to code is divided has been determined in steps S1700 and S1701 of FIG. 17. In step S103, the CPU 901 acquires division state information that indicates the result of division determination.

In step S104, the CPU 901 refers to the state of division of the target block acquired, and determines whether the target block is divided. If the target block is divided (YES in step S104), the CPU 901 performs step S106. If the target block is not divided (NO in step S104), the CPU 901 performs step S105.

In step S105, the CPU 901 determines whether the target block size is greater than or equal to the image quality control minimum block size. If the target block size is determined to be greater or equal (YES in step S105), the CPU 901 performs step S107 and the subsequent step. If not (NO in step S105), the CPU 901 ends the image quality parameter coding processing.

In step S106, the CPU 901 determines whether the target block size is equal to the image quality control minimum block size. If the target block size is determined to be equal to the image quality control minimum block size (YES in step S106), the CPU 901 performs steps S107 and S108. If not (NO in step S108), the CPU 901 ends the image quality parameter coding processing.

In step S107, the CPU 901 acquires an image quality parameter. The image quality parameter is the one determined in step S1703 or S1708 of FIG. 17. In step S108, the CPU 901 codes the image quality parameter. In the present exemplary embodiment, the CPU 901 determines a difference value between the image quality parameter used to code the previous block and the image quality parameter acquired in step S107 as a QP_DELTA value. The CPU 901 codes the determined QP_DELTA value by Golomb coding into QP_DELTA code, which is image quality parameter code. In the present exemplary embodiment, QP_DELTA is coded by Golomb coding. However, this is not restrictive. QP_DELTA may be coded by arithmetic coding or other variable length coding. The image quality parameter is used to calculate a next QP_DELTA value.

FIG. 19 is a detailed flowchart of the image quality parameter calculation procedure performed in steps S1703 and S1708.

In step S1901, the CPU 901 acquires a target block size. In step S1902, the CPU 901 acquires an image quality control minimum block size. In step S1903, the CPU 901 acquires the state of division of the block. In step S1904, the CPU 901 determines whether the target block is divided. In step S1905, the CPU 901 determines whether the target block size is greater than or equal to the image quality control minimum block size. In step S1906, the CPU 901 determines whether the target block size is equal to the image quality control minimum block size. In step S1907, the CPU 901 calculates an image quality parameter.

The procedure of the steps will be described below. In step S1901, the CPU 901 acquires a target block size. Immediately after the present procedure is called from the procedure of FIG. 17, the target block to be processed is a lattice block itself. The value of the target block size is thus 64. As the level of the region quadtree structure descends subsequently due to recursive calls, the size value changes to 32, 16, and 8.

In step S1902, the CPU 901 acquires an image quality control minimum block size that is set from outside. In the present exemplary embodiment, the image quality control minimum block size is 16 in value.

Whether the target block to code is divided has been determined in steps S1700 and S1701 of FIG. 17. In step S1903, the CPU 901 acquires division state information that indicates the result of division determination.

In step S1904, the CPU 901 refers to the state of division of the target block acquired, and determines whether the target block is divided. If the target block is divided (YES in step S1904), the CPU 901 performs step S1906. If the target block is not divided (NO in step S1904), the CPU 901 performs step S1905.

In step S1905, the CPU 901 determines whether the target block size is greater than or equal to the image quality control minimum block size. If the target block size is determined to be greater or equal (YES in step S1905), the CPU 901 performs step S1907. If not (NO in step S1905), the CPU 901 ends the image quality parameter calculation processing.

In step S1906, the CPU 901 determines whether the target block size is equal to the image quality control minimum block size. If the target block size is determined to be equal to the image quality control minimum block size (YES in step S1906), the CPU 901 performs step S1907. If not (NO in step S1906), the CPU 901 ends the image quality parameter calculation processing.

In step S1907, the CPU 901 performs rate control processing to calculate an image quality parameter for coding the target block. For example, as with TM5, the CPU 901 predicts the amount of code of the target block and calculates an optimum quantization parameter. If the target block is divided, all the divisional blocks included are subjected to the rate control. The divisional blocks included are coded with the same image quality parameter.

The coding method according to the present exemplary embodiment is used to output data that has a data structure illustrated in FIGS. 15 and 16. Referring to FIG. 15, the frame header information includes the code of the image quality control minimum block size which is embedded in step S1303 of FIG. 13. All the lattice blocks within the frame are under control of the code. Referring to FIG. 16, a division flag on a lattice block, or a block of 64×64 pixels, is followed by a division flag on an upper left block of 32×32 pixels in the subsequent level. If the block of 32×32 pixels is not divided, the image quality parameter code or QP_DELTA code of that block follows, accompanied by the code of coefficient data on the residual of the 32×32 pixels. There follows a division flag on an upper right block of 32×32 pixels. As said before, if a block of 32×32 pixels is divided into blocks of 16×16 pixels, a division flag follows to indicate the state of division. If a block is not divided further, QP_DELTA code and coefficient data code follow. The image quality control minimum block size is 16. If a block is divided into blocks smaller than 16×16 pixels, a division flag and coefficient data code follow without QP_DELTA code added to the smaller blocks.

As described above, a target block size is compared with the image quality control minimum block size, and whether to code a QP_DELTA value is controlled depending on the comparison result. The provision of such a mechanism enables image quality control in units of blocks into which an image is divided in a lattice pattern. The image quality control can be performed in finer units (FIG. 12C) than in a conventional case where QP_DELTA code is embedded in units of lattice blocks (FIG. 12A). This can narrow boundaries between blocks of different image qualities and make differences in image quality less noticeable. In another conventional case, image quality control is performed and QP_DELTA code is embedded in units of orthogonal transform blocks (FIG. 12B). Unlike such a case, the amount of code will not increase more than necessary, because the unit of image quality control can be selected and QP_DELTA code need not be embedded in every orthogonal transform block. The image quality parameter calculation procedure is performed only if the same condition as that for inserting an image quality parameter holds. The calculation of the image quality parameter is thus also prevented from increasing more than unnecessary.

In the present exemplary embodiment, blocks are defined as square blocks. It will be understood that blocks may be rectangular, such as 8×4 pixels. While the region quadtree structure is scanned by using recursive processing, loop structures may be used to implement the scanning.

As illustrated in FIG. 10, the coding method according to the present exemplary embodiment may be performed by a configuration that includes dedicated hardware such as an orthogonal transformer 1003, a quantizer 1004, and a variable-length coder 1005. The CPU 1001 will not perform the orthogonal transform, quantization, and variable-length coding step, but makes the foregoing units perform the respective parts of the processing. In other respects, the procedure is the same as that illustrated in FIG. 17.

The present exemplary embodiment has dealt with the case where coded data is recorded on the HDD 903. However, this is not restrictive. Coded data may be recorded on a recording medium other than the hard disk device 903. It will be appreciated that coded data may be transmitted to a communication circuit via a communication interface 905. An external recording device may be connected to record coded data on a portable medium.

The present exemplary embodiment has also dealt with the case where software applications are recorded on the hard disk device 903. However, this is not restrictive. Software applications may be recorded on a piece of hardware such as a read-only memory (ROM). It will be appreciated that software applications may be recorded on a portable medium such as a memory card and a disk.

The present exemplary embodiment has also dealt with the case where the number of times of division is coded to produce code that indicates the size of an image quality control minimum block. However, this is not restrictive. Since the maximum block size is that of a lattice block, the size of an image quality control minimum block may be expressed by a 6-bit fixed length code. An image quality control minimum block is not limited to a square configuration. Image quality control minimum blocks for horizontal and vertical configurations may be provided separately. For example, horizontally or horizontally adjoining blocks may be grouped together, and image quality parameters may be controlled in units of the block groups. In such a case, the sizes of image quality control minimum blocks may effectively be set for horizontal and vertical configurations separately.

An image decoding method according to a second exemplary embodiment of the present invention will be described with reference to FIGS. 2, 9, 14, and 18.

FIG. 9 illustrates a configuration for executing a decoding program that includes the decoding method according to the present exemplary embodiment. The recording program is recorded on the HDD 903. The decoding program is loaded into the RAM 902, and the CPU 901 performs the steps of a procedure to be described below for decoding processing. Input coded data is read from the HDD 903. A decoded image is output via an image output buffer which is provided in a video RAM (VRAM) 904. The CPU 901 performs the decoding processing block by block. Each block is decoded to produce a decoded image of the block, which is copied to an appropriate position in a frame when output to the image output buffer. When the decoding processing on blocks as much as a single frame is completed, a frame of image is output to an output buffer. The following description will be given on the assumption that the input coded data is coded data that is generated in the first exemplary embodiment.

FIG. 14 illustrates the procedure for decoding input coded data. Lattice blocks are decoded in a raster scan order. In step S1401, the CPU 901 decodes and acquires frame header information. The present exemplary embodiment deals with the case where the frame header information includes an image quality control minimum block size. However, this is not restrictive. According to a predetermined data format, an image quality control minimum block size may be acquired from header information on a sequence, a picture, a slice, or a block of highest hierarchical level. In step S1402, the CPU 901 decodes and acquires an image quality control minimum block size. In step S1403, the CPU 901 makes a setting so that the decoding result of the coded data is first stored into a first target lattice block. In step S1404, the CPU 901 decodes the prediction mode of the target lattice block and generates a predicted image according to the prediction mode. In step S1405, the CPU 901 performs a divisional block decoding procedure on the target lattice block. In step S1406, the CPU 901 adds predicted image data and residual data of the target lattice block, and outputs the resultant to the image output buffer. In step S1407, the CPU 901 determines whether all lattice blocks in a frame are processed. In step S1408, the CPU 901 sets the next lattice block as a target lattice block.

The procedure of the steps will be described below. In step S1401, the CPU 901 acquires a parameter called image quality control minimum block size from header information on a block that is of the highest order in terms of sequences, pictures, frames, slices, and hierarchical structure.

In step S1402, the CPU 901 decodes and acquires the image quality control minimum block size. According to the first exemplary embodiment, the image quality control minimum block size is coded as an index. The image quality control minimum block size is 16. In step S1403, the CPU 901 sets the lattice block on the top left of the screen as a target lattice block.

In step S1404, the CPU 901 decodes coded data on the target lattice block. The CPU 901 thereby decodes an intra-frame prediction mode and/or motion vectors generated in the first exemplary embodiment. With intra coding, the CPU 901 refers to adjacent decoded pixels and generates predicted image data based on the intra-frame prediction mode decoded. With inter coding, the CPU 901 performs motion compensation to generate predicted image data based on the motion vectors.

In step S1405, the CPU 901 performs a divisional block decoding procedure, which will be described below in conjunction with FIG. 18, on the lattice block. Since the decoding of divisional blocks is hierarchically structured, the CPU 901 decodes division flags on blocks and determines the states of divisional blocks while performing decoding. The CPU 901 thereby generates image quality parameters and residual data with respect to predictions.

In step S1406, the CPU 901 adds the predicted image data generated in step S1404 and the residual data generated in step S1405 to generate a decoded image of the target lattice block. The CPU 901 outputs the decoded image to the image output buffer.

In step S1407, the CPU 901 determines whether all the lattice blocks in the frame are processed for decoding. For example, the CPU 901 counts the number of lattice blocks decoded. If not all the lattice blocks are processed for decoding (NO in step S1407), the CPU 901 proceeds to step S1408. If all the lattice blocks are decoded (YES in step S1407), the CPU 901 ends the decoding processing on the frame.

In step S1408, the CPU 901 sets the result of decoding that comes next in a raster scan order as the next target lattice block.

FIG. 18 is a detailed flowchart of step S1405, illustrating a procedure for decoding a plurality of hierarchically structured orthogonal transform blocks of different sizes. Specifically, FIG. 18 illustrates a procedure for performing variable-length decoding, an inverse orthogonal transform, and inverse quantization on variable-length coded coefficient data based on block division flag code and QP_DELTA code, to generate residual data. The present exemplary embodiment uses a region quadtree structure for hierarchical structuring. A block at the highest level (first target block to be processed) is a lattice block of 64×64 pixels.

In step S1801, the CPU 901 decodes a block division flag on the target block. In step S1802, the CPU 901 performs an image quality parameter decoding procedure. In step S1803, the CPU 901 determines whether the target block to decode is divided. In step S1804, the CPU 901 performs variable-length decoding, inverse quantization, and an inverse orthogonal transform. In step S1805, the CPU 901 recursively performs decoding processing on divisional blocks included.

The procedure of the steps will be described below. In step S1801, the CPU 901 decodes a block division flag such as the one illustrated in FIG. 16 to acquire information as to whether the target block is subdivided. Decoding is performed according to a quadtree hierarchical structure. The CPU 901 can thereby acquire the state of division of blocks.

In step S1802, the CPU 901 performs an image quality parameter decoding procedure to be described below in conjunction with FIG. 2. The CPU 901 thereby decodes an image quality parameter which is used in inverse quantization for decoding the target block.

In step S1803, the CPU 901 refers to the decoded block division flag to determine whether the target block is divided. If the target block is determined to be not divided (NO in step S1803), the CPU 901 performs step S1804. If the target block is determined to be divided (YES in step S1803), the CPU 901 performs step S1805.

In step S1804, the CPU 901 performs variable-length decoding, inverse quantization, and an inverse orthogonal transform on coded coefficient data of the target block, thereby generating residual data. For variable-length decoding, the CPU 901 performs decoding according to the coding scheme used in the first exemplary embodiment. The CPU 901 thereby acquires quantization coefficient data included in the block. For inverse quantization, the CPU 901 uses the image quality parameter decoded in step S1802. If no new image quality parameter is decoded in S1802, the CPU 901 performs inverse quantization by simply using the image quality parameter previously decoded. The CPU 901 performs an inverse orthogonal transform on the coefficient data resulting from the inverse quantization, thereby generating residual data.

In step S1805, the CPU 901 recursively performs the processing in steps S1801 to S1805 as long as a block division flag decoded indicates the presence of a hierarchically subsequent level. The CPU 901 thereby restores residual data until the minimum divisional block size is reached.

Now, step S1802 intended for decoding an image quality parameter will be described in detail with reference to FIG. 2.

FIG. 2 illustrates a procedure for decoding an image quality parameter of a plurality of hierarchically structured orthogonal transform blocks of different sizes. In step S201, the CPU 901 acquires a target block size. In step S202, the CPU 901 acquires an image quality control minimum block size. In step S203, the CPU 901 acquires the state of division of the block. In step S204, the CPU 901 determines whether the target block is divided. In step S205, the CPU 901 determines whether the target block size is greater than or equal to the image quality control minimum block size. In step S206, the CPU 901 determines whether the target block size is equal to the image quality control minimum block size. In step S207, the CPU 901 decodes an image quality parameter.

The procedure of the steps will be described below. In step S201, the CPU 901 acquires a target block size. Immediately after the present procedure is called from the procedure of FIG. 18, the target block to be processed is a lattice block itself. The value of the target block size is thus 64. As division flags are decoded subsequently, the size value changes to 32, 16, and 8 accordingly.

In step S202, the CPU 901 acquires an image quality control minimum block size. In the present exemplary embodiment, the CPU 901 acquires the image quality control minimum block size decoded in step S1402 of FIG. 14.

In step S203, the CPU 901 acquires the state of division of the block. In the present exemplary embodiment, the CPU 901 acquires the block division flag decoded in step S1801 of FIG. 18.

In step S204, the CPU 901 determines the value of the block division flag. Using the same code assignment as that described in the first exemplary embodiment, a block division flag having a value of "0" indicates that the block is not divided. A block division flag having a value of "1" indicates that the block is divided. If the value of the block division flag is "0" (NO in step S204), the CPU 901 performs step S205. If the value is "1" (YES in step S204), the CPU 901 performs step S206.

In step S205, the CPU 901 determines whether the target block size is greater than or equal to the image quality control minimum block size. If the target block size is greater than or equal to the image quality control minimum block size (YES in step S205), the CPU 901 performs step S207. If not (NO in step S205), the CPU 901 ends the processing.

In step S206, the CPU 901 determines whether the target block size is equal to the image quality control minimum block size. If the target block size is equal to the image quality control minimum block size (YES in step S206), the CPU 901 performs step S207. If not (NO in step S206), the CPU 901 ends the processing.

In step S207, the CPU 901 decodes image quality parameter code. In the present exemplary embodiment, the CPU 901 decodes QP_DELTA code into a QP_DELTA value by Golomb decoding. In the present exemplary embodiment, QP_DELTA is decoded by Golomb decoding. However, this is not restrictive. QP_DELTA may be decoded by arithmetic decoding or other variable length decoding depending on the predetermined data format. The CPU 901 then adds the QP_DELTA value to the image quality parameter that is used to code the previous block, thereby generating an image quality parameter.

In the present exemplary embodiment, whether to decode an image quality parameter is controlled depending on the same condition as that for comparing the target block size in which the image quality parameter is coded and the image quality control minimum block size. This enables decoding a stream that is generated by the coding method described in the first exemplary embodiment.

As illustrated in FIG. 11, the decoding method according to the present exemplary embodiment may be performed by a configuration that includes dedicated hardware such as an inverse orthogonal transformer 1103, an inverse quantizer 1104, and a variable-length decoder 1105, instead of the configuration illustrated in FIG. 9. The CPU 1101 will not perform the inverse orthogonal transform, inverse quantization, and variable-length decoding step, but makes the foregoing units perform the respective parts of processing. In other respects, the procedure is the same as that illustrated in FIG. 18.

The present exemplary embodiment has dealt with the case where coded data is recorded on the hard disk device 903. However, this is not restrictive. Coded data may be received from a communication circuit via a communication interface 1006. An external recording device may be connected to input coded data from a portable medium.

The present exemplary embodiment has also dealt with the case where software applications are recorded on the hard disk device 903. However, this is not restrictive. Software applications may be record on a piece of hardware such as a read-only memory (ROM). It will be appreciated that software applications may be recorded on a portable medium such as a memory card and a disk.

A method of coding an image quality parameter according to a third exemplary embodiment of the present invention will be described with reference to FIG. 3. Unless otherwise specified, the configuration for performing the coding method and the operation of the steps are the same as in the first exemplary embodiment. In the present exemplary embodiment, a block that includes a target block and has the same size as an image quality control minimum block size will be defined as an image quality control minimum block. Information that indicates whether an image quality parameter is coded in an image quality control minimum block will be defined as image quality parameter coding state information. The image quality parameter coding state information is equivalent to information that indicates whether an image quality parameter of the first divisional block in the image quality control minimum block is coded.

FIG. 3 illustrates a procedure for coding an image quality parameter. FIG. 3 is a detailed flowchart of the image quality parameter coding procedure to be performed in steps S1705 and S1709 of FIG. 17. This procedure is performed instead of the image quality parameter coding procedure illustrated in FIG. 1. In step S301, the CPU 901 acquires image quality parameter coding state information. In step S302, the CPU 901 refers to the image quality parameter coding state information and determines whether an image quality parameter has already been coded in an image quality control minimum block.

The procedure of the steps will be described below. In step S104, like the first exemplary embodiment, the CPU 901 refers to the state of division of the target block acquired, i.e., whether the target block is further divided by a quadtree. If the target block is determined to be divided (YES in step S104), the CPU 901 ends the processing unlike the first exemplary embodiment. If the target block is determined to be not divided (NO in step S104), the CPU 901 performs step S105 like the first exemplary embodiment.

In step S105, like the first exemplary embodiment, the CPU 901 determines whether the target block size is greater than or equal to the image quality control minimum block size. If the target block size is determined to be greater or equal (YES in step S105), the CPU 901 performs steps S107 and S108 like the first exemplary embodiment. If not (NO in step S105), the CPU 901 performs the processing of steps S301 and S302.

In step S301, the CPU 901 acquires image quality parameter coding state information. In the present exemplary embodiment, the image quality control minimum block size is 16. If the target block is an upper left block of 8×8 pixels, it follows that the CPU 901 acquires information that no image quality parameter is coded. If the target block is an upper right, lower left, or lower right block of 8×8 pixels, an image quality parameter has already been coded in an upper left block of 8×8 pixels. In such a case, the CPU 901 acquires information that an image quality parameter is coded.

In step S302, the CPU 901 refers to the image quality parameter coding state information and determines whether an image quality parameter has already been coded in the image quality control minimum block. If no image quality parameter is determined to have been coded (NO in step S302), the CPU 901 performs steps S107 and S108. If an image quality parameter is determined to have been coded (YES in step S302), the CPU 901 ends the image quality parameter coding processing.

A difference between the present exemplary embodiment and the first exemplary embodiment will be described. In the first exemplary embodiment, QP_DELTA code is embedded as data that accompanies a target block (a set of divisional blocks) if "the target block is divided and the target block size is equal to the image quality control minimum block size." In the present exemplary embodiment, QP_DELTA code is added to an upper left block, which is the first block in a target block, if "the target block is divided and the target block size is equal to the image quality control minimum block size." In the present exemplary embodiment, the image quality control minimum block size is 16. Suppose that blocks divided as illustrated in FIG. 20 constitute a stream. In such a case, QP_DELTA code is inserted into immediately before pieces of variable-length coded coefficient data that correspond to the shaded blocks Nos. 0, 1, 7, 5, 6, 8, 9, 13, 14, and 15. In other words, QP_DELTA code accompanies blocks of 16×16 pixels or greater. If a block of 16×16 pixels is divided, QP_DELTA code accompanies the upper left block of 8×8 pixels, i.e., the first subdivided block of the block of 16×16 pixels.

The present exemplary embodiment can thus provide the same effects as those of the first exemplary embodiment, whereas the procedures and data structures have different concepts. In another possible configuration, no image quality parameter is coded unless quantization coefficients have a non-zero value. If an upper left block in a target block includes no quantization coefficient of a non-zero value, an image quality parameter is attached to a structurally subsequent first divisional block in which a quantization coefficient has a non-zero value. In step S301 of the present exemplary embodiment, the CPU 901 calculates and acquires image quality parameter coding state information from the size and position of the target block to code. However, this is not restrictive. For example, a flag may be provided that indicates whether an image quality parameter is coded within an image quality control minimum block size. The flag is reset each time the processing of dividing an image quality control minimum block is performed, and set each time an image quality parameter is coded. To acquire image quality parameter coding state information, the CPU 901 refers to the flag. If the flag is reset, the CPU 901 acquires information that no image quality parameter is coded. If the flag is set, the CPU 901 acquires information that an image quality parameter is coded.

A method of decoding an image quality parameter according to a fourth exemplary embodiment of the present invention will be described with reference to FIG. 4. Unless otherwise specified, the configuration for performing the decoding method and the operation of the steps are the same as in the second exemplary embodiment. In the present exemplary embodiment, a block that includes a target block and has the same size as an image quality control minimum block size will be defined as an image quality control minimum block. Information that indicates whether an image quality parameter is decoded in an image quality control minimum block will be defined as image quality parameter decoding state information.

FIG. 4 illustrates a procedure for decoding an image quality parameter. FIG. 4 is a detailed flowchart of the image quality parameter decoding procedure to be performed in step S1802 of FIG. 18. This procedure is performed instead of the image quality parameter decoding procedure illustrated in FIG. 2. In step S401, the CPU 901 acquires image quality parameter decoding state information. In step S402, the CPU 901 refers to the image quality parameter decoding state information and determines whether an image quality parameter has already been decoded in an image quality control minimum block.

The procedure of the steps will be described below. In step S204, the CPU 901 determines the value of the block division flag. If the value of the block division flag is "0" which indicates that the block is not divided (NO in step S204), the CPU 901 performs step S205 like the second exemplary embodiment. If the value of the block division flag is "1" which indicates that the block is divided (YES in step S204), the CPU 901 ends the image quality parameter decoding processing unlike the second exemplary embodiment.

In step S205, like the second exemplary embodiment, the CPU 901 determines whether the target block size is greater than or equal to the image quality control minimum block size. If the target block size is determined to be greater or equal (YES in step S205), the CPU 901 proceeds to step S207. In step S207, the CPU 901 decodes an image quality parameter like the second exemplary embodiment. If not (NO in step S205), the CPU 901 performs steps S401 and S402.

In step S401, the CPU 901 acquires image quality parameter decoding state information. In the present exemplary embodiment, the image quality control minimum block size is 16. If the target block is an upper left block of 8×8 pixels, it follows that the CPU 901 acquires information that no image quality parameter is decoded. If the target block is an upper right, lower left, or lower right block of 8×8 pixels, an image quality parameter has already been decoded in an upper left block of 8×8 pixels. In such a case, the CPU 901 acquires information that an image quality parameter is decoded.

In step S402, the CPU 901 refers to the image quality parameter decoding state information and determines whether an image quality parameter has already been decoded in the image quality control minimum block. If no image quality parameter has been decoded (NO in step S402), the CPU 901 performs step S207. If an image quality parameter has been decoded (YES in step S402), the CPU 901 ends the image quality parameter decoding processing.

In the present exemplary embodiment, whether to actually decode an image quality parameter is controlled based on the condition for comparing a target block size at which the image quality parameter is coded and the image quality control minimum block size, and a determination condition for determining whether the image quality parameter has already been decoded in the image quality control minimum block. Such a mode enables decoding a stream that is generated by the coding method described in the third exemplary embodiment. The coding method may employ a configuration such that no image quality parameter is coded unless quantization coefficients have a non-zero value. In such a case, the decoding method may employ a similar configuration. If an upper left block in a target block includes no quantization coefficient of a non-zero value, an image quality parameter is decoded in a structurally subsequent first divisional block in which a quantization coefficient has a non-zero value.

In step S401 of FIG. 4 according to the present exemplary embodiment, the CPU 901 calculates and acquires image quality parameter decoding state information from the size and position of the target block to decode. However, this is not restrictive. For example, a flag may be provided that indicates whether an image quality parameter is decoded within an image quality control minimum block size. The flag is reset each time the processing of dividing an image quality control minimum block is performed, and set each time an image quality parameter is decoded. To acquire image quality parameter decoding state information, the CPU 901 refers to the flag. If the flag is reset, the CPU 901 acquires information that no image quality parameter is decoded. If the flag is set, the CPU 901 acquires information that an image quality parameter is decoded.

A procedure for coding residual data in a block will be described with reference to FIG. 5. This procedure pertains to a method of coding an image quality parameter according to a fifth exemplary embodiment of the present invention. Unless otherwise specified, the configuration for performing the coding method and the operation of the steps are the same as in the first exemplary embodiment.

FIG. 5 illustrates a procedure for coding an image quality parameter and coding residual data. The procedure implements the processing illustrated in FIGS. 17 and 1. This procedure is called from step S1306 of FIG. 13. In step S501, the CPU 901 acquires a target block size. In step S502, the CPU 901 acquires an image quality control minimum block size. In step S503, the CPU 901 calculates costs when the target block is divided and when not, respectively. In step S504, the CPU 901 determines whether to divide the target block. In step S505, the CPU 901 outputs a block division flag set as false. In step S506, the CPU 901 determines whether the target block size is greater than or equal to the image quality control minimum block size. In step S507, the CPU 901 calculates an image quality parameter. In step S508, the CPU 901 performs a procedure for coding the image quality parameter. In step S509, the CPU 901 performs prediction and performs an orthogonal transform, quantization, and variable-length coding. In step S510, the CPU 901 outputs a block division flag set as true. In step S511, the CPU 901 determines whether the target block size is equal to the image quality control minimum block size. In step S512, the CPU 901 calculates an image quality parameter. In step S513, the CPU 901 codes the image quality parameter. In step S514, the CPU 901 processes divisional blocks included.

The processing procedure will be concretely described below. In step S501, the CPU 901 acquires a target block size. Immediately after the present procedure is called from the procedure of FIG. 13, the target block to be processed is a lattice block itself. In the present exemplary embodiment, the value of the target block size is, though not limited to, 64. As the level of the region quadtree structure descends subsequently due to recursive calls, the size value changes to 32, 16, and 8. Note that the number of levels is not limited thereto.

In step S502, the CPU 901 acquires an image quality control minimum block size that is set from outside. In the present exemplary embodiment, the value of the image quality control minimum block size is, though not limited to, 16.

In step S503, the CPU 901 calculates costs when the block is divided and when not, respectively. The costs are calculated by using Lagrange multipliers mentioned above, as well as image characteristics, statistics, and predicted code lengths.

In step S504, the CPU 901 compares the costs with and without division, calculated in step S503. If the cost with block division is lower than the cost without block division (YES in step S504), the CPU 901 performs steps S510 to S514. If not (NO in step S504), the CPU 901 performs steps S505 to S509.

In step S505, the CPU 901 outputs a block division flag set as false. In step S506, the CPU 901 determines whether the target block size is greater than or equal to the image quality control minimum block size. If the target block size is greater or equal (YES in step S506), the CPU 901 performs steps S507 to S509. If not (NO in step S506), the CPU 901 performs step S509 without performing steps S507 and S508.

In step S507, the CPU 901 performs rate control on the target block to calculate an image quality parameter. In step S508, the CPU 901 codes the image quality parameter calculated in step S507. In the present exemplary embodiment, the CPU 901 determines a difference value between the image quality parameter used in the previous block and the image quality parameter calculated in step S507 as a QP_DELTA value. The CPU 901 codes the determined QP_DELTA value by Golomb coding into QP_DELTA code, which is image quality parameter code.

In step S509, the CPU 901 performs an orthogonal transform, quantization, and variable-length coding on residual data to generate coded coefficient data. The CPU 901 performs the quantization by using the image quality parameter calculated in step S507. If in step S506 the target block size is determined to be smaller than the image quality control minimum block size (NO in step S506), the CPU 901 uses the same image quality parameter as that used for the previous quantization.

In step S510, the CPU 901 codes a block division flag set as true. In step S511, the CPU 901 determines whether the target block size is equal to the image quality control minimum block size. If the target block size is equal to the image quality control minimum block size (YES in step S511), the CPU 901 performs steps S512 to S514. If not (NO in step S511), the CPU 901 performs step S514 without performing steps S512 and S513.

In step S512, the CPU 901 performs rate control processing to calculate an image quality parameter for coding the target block with. All divisional blocks included are subjected to the rate control. The divisional blocks included are coded with the same image quality parameter.

In step S513, the CPU 901 performs the same operation as in step S508 to code the image quality parameter calculated in step S512. In step S514, the CPU 901 recursively performs the present procedure on four divisional blocks (upper left, upper right, lower left, and lower right) that are included in the hierarchically subsequent level. The divisional blocks each have a size ½ that of the original target block both in height and width. The target block size decreases division after division. Such recursive processing can be performed up to a block size as small as 8×8 pixels. By the recursive processing, division flag code, QP_DELTA code, and coefficient data on respective divisional blocks are output as a stream in a structural order as illustrated in FIG. 16.

As described above, the rate control processing and the image quality parameter coding processing may be integrated with each other. Even such a configuration enables image quality control in finer units like the method of coding an image quality parameter described in the third exemplary embodiment.

A method of decoding an image quality parameter according to a sixth exemplary embodiment of the present invention will be described with reference to FIG. 6.

FIG. 6 illustrates a procedure for decoding an image quality parameter. This procedure is applied to step S1405 of FIG. 14. In step S601, the CPU 901 acquires the size of a target block to decode. In step S602, the CPU 901 acquires an image quality control minimum block size. In step S603, the CPU 901 decodes a block division flag. In step S604, the CPU 901 determines whether the target block to decode is divided. In step S605, the CPU 901 determines whether the target block size is greater than or equal to the image quality control minimum block size. In step S606, the CPU 901 decodes an image quality parameter. In step S607, the CPU 901 performs variable-length decoding, inverse quantization, and an inverse orthogonal transform. In step S608, the CPU 901 determines whether the target block size is equal to the image quality control minimum block size. In step S609, the CPU 901 decodes an image quality parameter. In step S610, the CPU 901 recursively calls the present procedure for decoding, targeted for divisional blocks included.

The procedure of the steps will be concretely described below. In step S601, the CPU 901 acquires the size of a target block to decode. Immediately after the present procedure is called from the procedure of FIG. 14, the target block to be processed is a lattice block itself. In the present exemplary embodiment, a lattice block has, though not limited to, a size value of 64. As the level of the region quadtree structure descends subsequently due to recursive calls, the size value changes to 32, 16, and 8. Note that the number of levels is not limited thereto.

In step S602, the CPU 901 acquires an image quality control minimum block size. In the present exemplary embodiment, the CPU 901 acquires the image quality control minimum block size that is embedded in frame header information.

In step S603, the CPU 901 acquires the state of division of the block. In the present exemplary embodiment, the CPU 901 refers to the value of the block division flag that is decoded in step S1801 of FIG. 18.

In step S604, the CPU 901 determines whether the value of the block division flag is true or false. If false (NO in step S604), the CPU 901 performs steps S605 to S607. If true (YES in step S604), the CPU 901 performs steps S608 to S610.

In step S605, the CPU 901 determines whether the target block size is greater than or equal to the image quality control minimum block size. If the target block size is greater than or equal to the image quality control minimum block size (YES in step S605), the CPU 901 performs steps S606 and S607. If not (NO in step S605), the CPU 901 performs step S607 without performing step S606.

In step S606, the CPU 901 decodes image quality parameter code. In the present exemplary embodiment, the CPU 901 decodes QP_DELTA code into a QP_DELTA value by Golomb decoding. The CPU 901 then adds the QP_DELTA value to an image quality parameter that is used in the previous inverse quantization, thereby generating an image quality parameter.

In step S607, the CPU 901 performs variable-length decoding, inverse quantization, and an inverse orthogonal transform. For inverse quantization, the CPU 901 uses the image quality parameter decoded in step S606. If the target block size is smaller than the image quality control minimum block size (NO in step S608), the CPU 901 uses the image quality parameter that is used to inversely quantize the previous target block. Subsequently, the CPU 901 ends the decoding of the target block.

In step S608, the CPU 901 determines whether the target block size is equal to the image quality control minimum block size. If the target block size is equal to the image quality control minimum block size (YES in step S608), the CPU 901 performs step S609. If not (NO in step S608), the CPU 901 proceeds to step S610 without performing step S609.

In step S609, the CPU 901 decodes image quality parameter code as in step S606. In step S610, the CPU 901 recursively performs the present procedure on four divisional blocks (upper left, upper right, lower left, and lower right) that are included in the hierarchically subsequent level. The divisional blocks each have a size ½ that of the original target block both in height and width. The target block size decreases division after division. By such recursive processing, the CPU 901 decodes division flag code, QP_DELTA code, and coefficient data on each divisional block in the order of the region quadtree structure as illustrated in FIG. 16.

As described above, the recursive processing for scanning the region quadtree structure and the image quality parameter decoding processing may be integrated with each other. Even such a configuration can decode a stream that is coded by the coding method according to the first exemplary embodiment or the fifth exemplary embodiment.

A seventh exemplary embodiment of the present invention deals with a divisional block coding method. The divisional block coding method according to the present exemplary embodiment is implemented by using the configuration illustrated in FIG. 9.

Prior to coding, the CPU 901 sets a profile and a level. Profiles describe characteristics of a stream to be generated in the present exemplary embodiment. Levels are a set of parameters that are allowable depending on the processing performance of the decoder. Since processing performance mainly depends on image size, levels are defined for respective image sizes. However, the units of level definition are not limited to image sizes. For example, levels may be set according to the number of lattice blocks to be processed because processing performance depends on the number. In the present exemplary embodiment, image quality control minimum block sizes are set to a minimum value in each level. FIGS. 21A and 21B illustrate tables that define image quality control minimum block sizes limited by profile and by level.

The present exemplary embodiment deals with a case where the profiles include a baseline profile that uses only basic tools and a main profile that uses other tools. However, the profiles are not limited thereto.

FIG. 21A illustrates a table that shows levels and the limits of image quality control minimum block sizes in the baseline profile. FIG. 21B illustrates a table that shows levels and the limits of image quality control minimum block sizes in the main profile.

In the present exemplary embodiment, levels are classified by the maximum number of lattice blocks (64×64 pixels) included in a frame. Specifically, level 1 is intended for relatively small images such as 640×480 pixels. Level 2 is intended for medium-sized images of 1920×1080 pixels. Level 3 is intended for large images of 4096×2160 pixels. It should be noted that the number of levels and the level classifications do not limit the gist of the present invention.

The baseline profile illustrated in FIG. 21A will be described. Level 1 shows that the minimum value of an image quality control minimum block size is 8 and image quality control minimum block sizes can be set in the range of 8 to 64. Level 2 shows that the minimum value of an image quality control minimum block size is 16 and image quality control minimum block sizes can be set in the range of 16 to 64. Level 3 shows that the minimum value of an image quality control minimum block size is 32 and image quality control minimum block sizes can be set in the range of 32 to 64. The main profile illustrated in FIG. 21B shows that image quality control minimum block sizes are controlled within the range of 8 to 64 regardless of the level.

The CPU 901 determines the profile and level depending on conditions of a coding method or apparatus, such as tools and memory capacities, and/or in consideration of conditions of a decoding method or apparatus. However, the method of determining the profile and level is not limited in particular. A not-illustrated user may set a profile and a level. The determined profile and level may be coded, included into a sequence header which describes information on an entire moving image, and output from the communication interface 905. Such a profile and level may be recorded on the HDD 903.

Next, a procedure for coding frames will be described. In step S1301 of FIG. 13, like the first exemplary embodiment, the CPU 901 initially sets a parameter of an image quality control minimum block size. FIG. 22 is a flowchart illustrating a method of calculating an image quality control minimum block size. In step S2201, the CPU 901 determines a profile type. If the profile type is a baseline profile (BASELINE PROFILE in step S2202), the CPU 901 performs step S2204 and subsequent steps. If the profile type is a main profile (MAIN PROFILE in step S2202), the CPU 901 performs step S2203.

The case with the main profile will be described first. In step S2203, the CPU 901 sets the image quality control minimum block size to 8. The CPU 901 then ends the processing.

Next, the case with the baseline profile will be described. In step S2204, the CPU 901 acquires a level value. In the present exemplary embodiment, the level value is calculated according to an input image size. The level value indicates a minimum level at which a stream of the input image size can be decoded.

In step S2205, the CPU 901 determines whether the level value is 1. If the determination is true (YES in step S2205), the CPU 901 performs step S2206. If the determination is false (NO in step S2205), the CPU 901 performs step S2207. In step S2206, the CPU 901 sets the image quality control minimum block size to 8. In step S2207, the CPU 901 determines whether the level value is 2. If the determination is true (YES in step S2207), the CPU 901 performs step S2208. If the determination is false (NO in step S2207), the CPU 901 performs step S2209. In step S2208, the CPU 901 sets the image quality control minimum block size to 16. In step S2209, the CPU 901 sets the image quality control minimum block size to 32.

Then, the CPU 901 returns to the process illustrated in FIG. 13. In step S1302, like the first exemplary embodiment, the CPU 901 codes the image quality control minimum block size. In step S1303, the CPU 901 generates frame header information including the coded data. FIG. 23A illustrates the generated bit stream. A sequence header includes coded data on a profile and a level, followed by codes that indicate image size. A frame header in each piece of frame data includes image quality control minimum block size code, with a size setting greater than or equal to the minimum value of an image quality control minimum block size defined in FIG. 21A.

FIG. 24 is a flowchart illustrating an entire procedure. In step S2401, the CPU 901 inputs the size of an image to be coded. In step S2402, the CPU 901 selects a profile. The CPU 901 also selects a level according to FIG. 21A or 21B.

In step S2403, the CPU 901 acquires the minimum value of an image quality control minimum block size according to the selected level. In step S2404, the CPU 901 codes the selected profile and level. In step S2405, the CPU 901 generates a sequence header including the coded data on the profile and level. In step S2406, the CPU 901 performs coding in units of frames. Possible sizes of image quality control minimum blocks in each frame are greater than or equal to the foregoing minimum value of an image quality control minimum block size. In step S2407, the CPU 901 determines whether all frames are coded. If not all frames are coded (NO in step S2407), the CPU 901 proceeds to step S2406 to code a next frame. If all frames are coded (YES in step S2407), the CPU 901 ends the coding processing.

The provision of profiles and levels and the limitation of image quality control minimum block sizes enable determination of image quality control minimum block sizes depending on image size. It is, therefore, possible to code an image while omitting operations in smaller blocks without causing a decrease in image quality. This allows designing an optimum circuit for an intended apparatus and designing a configuration for suppressed certain power consumption. For example, a baseline profile may be used for mobile communications, so that severe load restrictions can be imposed on coding operations in view of battery run time. A main profile may be used for battery-less stationary apparatuses, whereby looser restrictions are imposed on the operation load. In terms of software, operation time for performing quantization control in blocks smaller than image quality control minimum block sizes can be omitted for speedup.

It will be understood that a profile and level-based coding method, like the present exemplary embodiment, may be applied to the third and fifth exemplary embodiments.

The minimum values of an image quality control minimum block size determined for respective levels, illustrated in FIGS. 21A and 21B, may always be used in the respective levels. In such a case, image quality control minimum block size code to be included in each frame can be omitted. FIG. 23B illustrates such a bit stream. The bit stream illustrated in FIG. 23B differs from that illustrated in FIG. 23A in that the frame headers include no image quality control minimum block size code. Image quality control minimum block sizes in the sequence are fixed to the minimum value of an image quality control minimum block size that is defined for the profile and level. This provides the effect of removing redundant code for improved coding efficiency.

Memory capacities for storing quantization matrices smaller than the image quality control minimum block size and processing for updating such quantization matrices can also be omitted.

An eighth exemplary embodiment of the present invention deals with an image decoding method for decoding a bit stream that is generated in the seventh exemplary embodiment. The image decoding method according to the present exemplary embodiment is implemented by using the configuration illustrated in FIG. 9.

Prior to decoding frames, the CPU 901 inputs and decodes a sequence header. The CPU 901 decodes code related to a profile and level according to FIG. 23A. The CPU 901 also decodes image width code and image height code. If the decoded profile is a baseline profile, the CPU 901 refers to the table of FIG. 21A. The CPU 901 further selects and determines the minimum value of an image quality control minimum block size corresponding to the level. If the decoded profile is a main profile, the CPU 901 refers to the table of FIG. 21B and sets the minimum value of an image quality control minimum block size to 8.

At this point in time, the CPU 901 reserves buffers and other necessary memories on the RAM 902. For example, with a baseline profile in level 2, no image quality control will be performed in a block size of 8×8 pixels. In such a case, memory areas for storing image quality parameters in units of 8×8-and 4×4-pixel blocks may be omitted.

The CPU 901 decodes frames according to the flowchart of FIG. 14, which has been described in the second exemplary embodiment. In step S1402, the CPU 901 decodes an image quality control minimum block size included in a frame header. In step S1405, the CPU 901 performs hierarchical decoding with a lattice block as a target block. In step S1805 of FIG. 18 described in the second exemplary embodiment, the CPU 901 performs recursive processing according to hierarchical levels, thereby decoding image quality control parameters up to blocks of the image quality control minimum block size.

FIG. 25 is a flowchart illustrating an entire procedure. In step S2501, the CPU 901 inputs a sequence header. In step S2502, the CPU 901 decodes coded data on a profile and a level, thereby acquiring the profile and level. In step S2503, the CPU 901 acquires the minimum value of an image quality control minimum block size according to the selected level. In step S2504, the CPU 901 performs decoding in units of frames. This ensures that possible sizes of image quality control minimum blocks in each frame are greater than or equal to the foregoing minimum value of an image quality control minimum block size. In step S2505, the CPU 901 determines whether all frames are decoded. If not all frames are decoded (NO in step S2505), the CPU 901 proceeds to step S2504 to decode a next frame. If all frames are decoded (YES in step S2505), the CPU 901 ends the decoding processing.

The provision of profiles and levels and the limitation of image quality control minimum block sizes enable determination of image quality control minimum block sizes depending on image size. It is, therefore, possible to decode an image while omitting operations in smaller blocks without causing a decrease in image quality. The determination of image quality control minimum block sizes can reduce the number of times of recursive processing, whereby variations in time for performing decoding in units of lattice blocks can be suppressed.

Consequently, it is possible to design an optimum circuit for an intended apparatus and design a configuration for suppressed certain power consumption. For example, a baseline profile may be used for mobile communications, so that severe load restrictions can be imposed on coding operations in view of battery run time. A main profile may be used for battery-less stationary apparatuses, whereby looser restrictions are imposed on the operation load. In terms of software, operation time for performing quantization control in blocks smaller than image quality control minimum block sizes can be omitted for speedup.

It will be understood that the CPU 901 may decode profile and level-related code according to FIG. 23B. As in the foregoing description, the CPU 901 inputs and decodes a sequence header. According to the resulting profile and level, the CPU 901 determines an image quality control minimum block size as described above. When decoding frames, the CPU 901 skips step S1402 and uses the image quality control minimum block size.

The unique determination of an image quality control minimum block size according to the profile and level makes image decoding possible without image quality control minimum block size code in each frame header.

The CPU 901 may compare a decoded image quality control minimum block size with an image quality control minimum block size that is determined by the profile and level. If the latter is greater than the former, the CPU 901 may detect the bit stream for an error.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The invention claimed is:

1. An image encoding apparatus comprising:
a determination unit configured to determine a block size of a block included in an image;
an information encoding unit configured to encode information on a minimum area size related to a quantization parameter; and
an encoding unit configured to encode a difference value for a quantization parameter capable of being shared in encoding processes for a block group including a plurality of blocks, a size of each of the plurality of blocks being smaller than the minimum area size,
wherein the plurality of blocks includes at least a first block and a second block processed subsequent to the first block,
wherein the encoding unit is configured to encode the difference value in processing of the first block, in a case where the first block contains a coefficient value not equal to 0, and
wherein the encoding unit is configured to encode the difference value in processing of the second block, in a case where the second block contains a coefficient value not equal to 0, and the difference value has not been encoded in the processing of the first block.

2. The image encoding apparatus according to claim 1, wherein the encoding unit is configured to encode a difference value for a quantization parameter used in an encoding process for a target block, in processing of the target block, in a case where the target block has a size equal to or larger than the minimum area size.

3. The image encoding apparatus according to claim 2, wherein the encoding unit is configured to encode the difference value for the quantization parameter used in the encoding process for the target block, in the processing of the target block, in a case where the target block is not divided.

4. The image encoding apparatus according to claim 1, wherein the encoding unit is configured to encode the difference value for the quantization parameter in one block in the block group.

5. The image encoding apparatus according to claim 1, wherein the encoding processes include quantization processes.

6. The image encoding apparatus according to claim 1, wherein information on the minimum area size is indicated by an index capable of identifying a block size.

7. The image encoding apparatus according to claim 1, wherein the determination unit is configured to determine, based on information indicating whether to divide the block, information on a block size of the block.

8. The image encoding apparatus according to claim 1, wherein the encoding unit is configured not to encode the difference value in the processing of the second block, in a case where the difference value has been encoded in the processing of the first block.

9. The image encoding apparatus according to claim 1, wherein the minimum area size is a block size for controlling a quantization process.

10. The image encoding apparatus according to claim 1, wherein the minimum area size is a minimum block size for controlling a quantization process.

11. The image encoding apparatus according to claim 1, wherein the encoding unit is configured to encode the image data by performing the encoding processes including quantization processes using the quantization parameter.

12. An image decoding apparatus configured to decode encoded data generated by encoding image data, the image decoding apparatus comprising:
an acquiring unit configured to acquire information on a minimum area size related to a quantization parameter and information on a block size of a block included in an image; and
a decoding unit configured to decode a difference value for a quantization parameter capable of being shared in decoding processes for a block group including a plurality of blocks, a size of each of the plurality of blocks being smaller than the minimum area size,
wherein the plurality of blocks includes at least a first block and a second block processed subsequent to the first block,
wherein the decoding unit is configured to decode the difference value in processing of the first block, in a case where the first block contains a coefficient value not equal to 0, and
wherein the decoding unit is configured to decode the difference value in processing of the second block, in a case where the second block contains a coefficient value not equal to 0, and the difference value has not been decoded in the processing of the first block.

13. The image decoding apparatus according to claim 12, wherein the decoding unit is configured to decode a difference value for a quantization parameter used in a decoding process for a target block, in processing of the target block, in a case where the target block has a size equal to or larger than the minimum area size.

14. The image decoding apparatus according to claim 13, wherein the decoding unit is configured to decode the difference value for the quantization parameter used in the decoding process for the target block in the processing of the target block, in a case where the target block is not divided.

15. The image decoding apparatus according to claim 12, wherein the decoding unit is configured to decode the difference value for the quantization parameter in one block in the block group.

16. The image decoding apparatus according to claim 12, wherein the decoding processes include inverse quantization processes.

17. The image decoding apparatus according to claim 12, wherein the information on the minimum area size is indicated by an index capable of identifying a block size.

18. The image decoding apparatus according to claim 12, wherein the acquiring unit is configured to acquire, based on information indicating whether to divide the block, the information on the block size.

19. The image decoding apparatus according to claim 12, wherein the decoding unit is configured not to decode the difference value in the processing of the second block, in a case where the difference value has been decoded in the processing of the first block.

20. The image decoding apparatus according to claim 12, wherein the minimum area size is a block size for controlling an inverse quantization process.

21. The image decoding apparatus according to claim 12, wherein the minimum area size is a minimum block size for controlling an inverse quantization process.

22. The image decoding apparatus according to claim 12, wherein the decoding unit is configured to decode the encoded data by performing the decoding processes including inverse quantization processes using the quantization parameter.

23. An image encoding method comprising:
determining, at a computing device, a block size of a block included in an image;
encoding, at the computing device, information on a minimum area size related to a quantization parameter; and
encoding, at the computing device, a difference value for a quantization parameter capable of being shared in encoding processes for a block group including a plurality of blocks, a size of each of the plurality of blocks being smaller than the minimum area size,
wherein the plurality of blocks includes at least a first block and a second block processed subsequent to the first block,
wherein the difference value is encoded in processing of the first block, in a case where the first block contains a coefficient value not equal to 0, and
wherein the difference value is encoded in processing of the second block, in a case where the second block contains a coefficient value not equal to 0, and the difference value has not been encoded in the processing of the first block.

24. A non-transitory computer-readable storage medium storing a program that, when executed, causes a computer to execute a process comprising:
determining a block size of a block included in an image;
encoding information on a minimum area size related to a quantization parameter; and
encoding a difference value for a quantization parameter capable of being shared in encoding processes for a block group including a plurality of blocks, a size of each of the plurality of blocks being smaller than the minimum area size,
wherein the plurality of blocks includes at least a first block and a second block processed subsequent to the first block,
wherein the difference value is encoded in processing of the first block, in a case where the first block contains a coefficient value not equal to 0, and
wherein the difference value is encoded in processing of the second block, in a case where the second block contains a coefficient value not equal to 0, and the difference value has not been encoded in the processing of the first block.

25. An image decoding method for decoding encoded data generated by encoding image data, the decoding method comprising:
acquiring, at a computing device, information on a minimum area size related to a quantization parameter and information on a block size of a block included in an image; and
decoding, at the computing device, a difference value for a quantization parameter capable of being shared in decoding processes for a block group including a plurality of blocks, a size of each of the plurality of blocks being smaller than the minimum area size,
wherein the plurality of blocks includes at least a first block and a second block processed subsequent to the first block,
wherein the difference value is decoded in processing of the first block, in a case where the first block contains a coefficient value not equal to 0, and
wherein the difference value is decoded in processing of the second block, in a case where the second block contains a coefficient value not equal to 0, and the difference value has not been decoded in the processing of the first block.

26. A non-transitory computer-readable storage medium storing a program that, when executed, causes a computer to execute a process comprising:
acquiring information on a minimum area size related to a quantization parameter and information on a block size of a block included in an image; and
decoding a difference value for a quantization parameter capable of being shared in decoding processes for a block group including a plurality of blocks, a size of each of the plurality of blocks being smaller than the minimum area size,
wherein the plurality of blocks includes at least a first block and a second block processed subsequent to the first block,
wherein the difference value is decoded in processing of the first block, in a case where the first block contains a coefficient value not equal to 0, and
wherein the difference value is decoded in processing of the second block, in a case where the second block contains a coefficient value not equal to 0, and the difference value has not been decoded in the processing of the first block.

27. The image encoding apparatus according to claim 1, wherein the encoding unit is configured not to encode the difference value in the processing of the first block, in a case where the first block does not contain a coefficient value not equal to 0.

28. The image decoding apparatus according to claim 12, wherein the decoding unit is configured not to decode the difference value in the processing of the first block, in a case where the first block does not contain a coefficient value not equal to 0.

29. The image decoding apparatus according to claim 12, further comprising a deriving unit configured to derive the quantization parameter from the difference value.

* * * * *